US006195790B1

(12) United States Patent
Tanimoto et al.

(10) Patent No.: US 6,195,790 B1
(45) Date of Patent: Feb. 27, 2001

(54) ELECTRICAL PARAMETER EVALUATION SYSTEM, ELECTRICAL PARAMETER EVALUATION METHOD, AND COMPUTER-READABLE RECORDING MEDIUM FOR RECORDING ELECTRICAL PARAMETER EVALUATION PROGRAM

(75) Inventors: Hiroyoshi Tanimoto; Toshiyuki Enda, both of Tokyo; Naoyuki Shigyo, Tokoy; Kazuya Matsuzawa, Tokyo, all of (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/061,866

(22) Filed: Apr. 17, 1998

(30) Foreign Application Priority Data

Apr. 18, 1997 (JP) .................................... 9-101947
Mar. 11, 1998 (JP) .................................. 10-060116

(51) Int. Cl.⁷ .............................. G06F 7/60; G06F 17/10; G06F 101/00; G06F 17/50
(52) U.S. Cl. .................................... 716/20; 716/4; 716/5; 703/2
(58) Field of Search ......................... 395/500.06; 716/5, 716/20

(56) References Cited

U.S. PATENT DOCUMENTS

| 5,604,357 | * | 2/1997 | Hori ........................................ 257/24 |
| 5,617,322 | * | 4/1997 | Yokota .............................. 364/468.04 |
| 5,677,846 | * | 10/1997 | Kumashiro ............................ 364/488 |
| 5,684,723 | * | 11/1997 | Nakadai .................................. 364/578 |
| 5,838,594 | * | 11/1998 | Kojima ................................... 364/578 |
| 5,926,403 | * | 7/1999 | Ho et al. ............................... 364/578 |
| 5,963,800 | * | 10/1999 | Augusto ................................ 438/212 |

FOREIGN PATENT DOCUMENTS 4-48744   2/1992  (JP) .

OTHER PUBLICATIONS

S. Kumashiro et al., A Triangular Mesh Generation Method Suitable for the Analysis of Complex MOS Device Structures, International Workshop on Numerical Modeling of Processes and Devices, pp. 167–170, Jun. 1994.*

(List continued on next page.)

Primary Examiner—Paul R. Lintz
Assistant Examiner—A. M. Thompsons
(74) Attorney, Agent, or Firm—Foley & Lardner

(57) ABSTRACT

A $\Delta Z$ calculator calculates difference between an inversion layer capacitance by a classical theory and an inversion layer capacitance by a quantum theory, calculates $\Delta Z$ which is a thickness of a semiconductor substrate equivalent to the difference in inversion layer capacitance. A discretization mesh generator generates a Delaunay discretization mesh for a structure of the semiconductor device to be evaluated. An electrical parameter calculator calculates electrical parameters of the semiconductor device under constraint that a charge density of channel conductivity type of the semiconductor device is set to zero at discretization mesh points of the discretization mesh on an interface between an insulating film and the semiconductor substrate and at discretization mesh points of the discretization mesh in the semiconductor substrate which are located within a distance less than the stored $\Delta Z$ from the interface between the insulating film and the semiconductor substrate.

19 Claims, 18 Drawing Sheets

OTHER PUBLICATIONS

T. Kojima et al., Dual Composite Mesh Method for Semiconductor Field Calculations, IEEE Transactions on Magnetics, pp. 4166–4169, Sep. 1991.*

M.J. van Dort et al., Quantum–Mechanical Threshold Voltage Shifts of MOSFET's Caused by High Levels of Channel Doping, Electron Devices Meeting, pp. 495–498, Sep. 1991.*

P.L. Levin et al., A Unified Boundary–element Finite–element Package, IEEE Transactions on Electrical Insulation, pp. 161–167, Apr. 1993.*

N. Hitschfeld et al., Mixed Element Trees: A Generalization of Modified Octrees for the Generation of Meshes for the Simulation of Complex 3–D Semiconductor Device Structures, IEEE Transactions on Computer–Aided Design of Integrated Circuits and Systems, Nov. 1993.*

Jin–Fa Lee et al., Automatic mesh Generation Using a Modified Delaunay Tessellation, IEEE Antennas and Propoagation Magazine, pp. 34–35, Feb. 1997.*

S. Hareland et al., A Computationally Efficient Model for Inversion Layer Quantization Effects in Deep Submicron N–Channel MOSFETs, IEEE Transactions on Electron Devices, pp. 90–96, Jan. 1996.*

T. Kojima, Dual Mesh Approach for Semiconductor Device Simulator, IEEE Transactions on Magnetics, pp. 2953–2955, Jul. 1989.*

MESH. Datasheet [online]. [retrieved on Nov. 16, 1999]. Integrated Systems Engineering AG, 1999. Retrieved from the Internet:<http:www.ise.com/products/mesh/index.html>, Oct. 1999.*

M.J. van Dort et al., Circuit Sensitivity in Terms of Process Parameters, International Electron Devices Meeting, pp. 941–944, Dec. 1995.*

Omega—An Octree–Based Mixed Element Grid Allocator for the Simulation of Complex 3–D Device Structures, IEEE Transactions on Computer–Aided Design of Integrated Circuits and Systems, pp. 1231–1241, Oct. 1991.*

W.,M. Coughran, et al., Adaptive Grid Generation for Semicondutor Device Simulation, Numerical Modeling of Processes and Devices for Integrated Circuits, pp. 27–28, Jun. 1990.*

K. Tanaka et al., Adaptive Mesh Generation in Three Dimensional Device Simulation, Numerical Modeling of Processes and Devices for Integrated Circuits, pp. 163–166, Jun. 1994.*

Wei–Kai Shih et al., An Accurate Preprocessor for Monte Carlo Study of Electron Transport in Inversion Layers of Silicon nMOSFETs, Device Research Conference, pp. 28–29, Jun. 1996.*

W. Hansch, et al., "Carrier Transport Near the $Si/SO_2$, Interface of a Mosfet", *Solid–State Electronics,* vol. 32, No. 10, pp. 839–849, 1989.

Yasuyuki Ohkura, "Quantum Effects in Si n–MOS Inversion Layer at High Substrate Concentration", *Solid–State Electronics,* vol. 33, No. 12, pp. 1581–1585, 1990.

M.J. VanDort, et al., "A Simple Model For Quantisation Effects In Heavily–Doped Silicon Mosfets at Inversion Conditions", *Solid–State Electronics,* vol. 33, No. 12, pp. 1581–1585, 1990.

* cited by examiner

ELECTRICAL PARAMETER EVALUATION SYSTEM, ELECTRICAL PARAMETER EVALUATION METHOD, AND COMPUTER-READABLE RECORDING MEDIUM FOR RECORDING ELECTRICAL PARAMETER EVALUATION PROGRAM

BACKGROUND OF THE INVENTION

1. Field of the Invention

The present invention relates to an electrical parameter evaluation system, an electrical parameter evaluation method, and a computer-readable recording medium for recording an electrical parameter evaluation program and, more particularly, a technique for evaluating electrical parameters of MISFET with the use of the Delaunay discretization scheme, which is capable of taking the quantum-mechanical effect in account approximately by a calculation time equivalent to that required for the simulator with the use of the classical theory and also is applicable to a case impurity distribution in a semiconductor substrate is not uniform.

2. Description of the Related Art

In the prior art, in a device simulator which executes electrical parameter evaluation of MISFET represented by a silicon MOSFET numerically by virtue of numerical calculation, Boltzmann statistics based on the classical theory has been employed as the carrier distribution. However, in the silicon MOSFET, a two-dimensional quantization effect of conductive carriers as a quantum-mechanical effect cannot be disregarded because of the thinner thickness of the gate oxide film and the higher concentration in the silicon substrate according to miniaturization of the device. Therefore, difference in calculation results obtained by the classical theory and the quantum theory has been going to become significant. In other words, a high precision simulation has been going to become difficult in the device simulator using the classical theory.

As one of phenomena in which the quantum-mechanical effect appears, it has been known that, since an inversion layer capacitance calculated based on the classical theory is different from an inversion layer capacitance calculated based on the quantum theory, an effective thickness of the gate oxide film taught by calculation results calculated based on the quantum theory becomes apparently thick rather than an actual thickness of the gate oxide film. The reason for this phenomenon has been set forth in the literature, Toriumi et al., "Quantitative Investigation of Inversion Layer Capacitance", SSD85-15, IECE, 1985. In this literature, first Toriumi et al. have measured the drain current when the gate voltage is changed while applying a constant slight drain voltage and then detected a maximum value of the current amplification factor (gm). Thus, as shown in FIG. 1, a relationship between a reciprocal of the maximum value of the current amplification factor (1/gm) and the thickness of a gate oxide film (Tox) has been derived.

FIG. 1 shows experimental results of two kinds of devices which have a different substrate concentration on a device surface respectively. In both cases, an apparent thickness of the gate oxide film is increased rather than a true thickness of the gate oxide film. In other words, both the reciprocal of gm and the thickness of the gate oxide film have a linearity, but they do not pass through the origin so that the reciprocal of gm is not in proportion to the thickness of the gate oxide film. This event is inconsistent with the consideration that the reciprocal of gm should be in proportion to the thickness of the gate oxide film.

Toriumi et al. have explained the reason for this inconsistency, i.e., since conduction charges constituting the inversion layer have a limited thickness because of two-dimensional quantization as the quantum-mechanical effect, the inversion layer capacitance in the actual device becomes different from the inversion layer capacitance calculated based on the classical theory. Since such difference in the inversion layer capacitance cannot be disregarded, high precision simulation carried out by the device simulator based on the classical theory has been going to become difficult.

Under such circumstance, various technologies for electrical parameter evaluation with regard to the quantum-mechanical effect have been disclosed in the prior art.

First, as the first technology in the prior art, a simulation in which the quantum-mechanical effect in the inversion layer is taken strictly into account has been carried out by F. Stern (F. Stern, "Self-Consistent Results for n-Type Si Inversion Layers", Phys. Rev. B5, 4891 (1972)).

In this literature, Schrodinger equation and Poisson equation have been solved in a self-consistent manner along one dimensional direction perpendicular to the interface between the Si substrate and the gate oxide film in the channel region of the Si N-type MOSFET.

This method can provide the most strict solution, but it has defects such that an extremely long time is required for calculation rather than the classical theory and that two-dimensional analysis and three-dimensional analysis which are indispensable for evaluation of a short channel effect, etc. are difficult.

On the contrary, methods which can take the quantum-mechanical effect approximately into account based on physical equations in the classical theory have been considered variously.

As the second technology in the prior art, the method proposed by W. Hansch et al. will be explained for the N-type MOSFET (W. Hansch et al., "Carrier Transport near the Si/SiO$_2$ Interface of a MOSFET", Solid-State Elec., 32, 839 (1989)). W. Hansch et al. have proposed the method in which the electron density nQM calculated quantummechanically is applied approximately to the electron density nCONV calculated based on the classical Boltzmann distribution in Eq.(1) to take the quantum-mechanical effect into account.

$$nQM = nCONV \cdot [1 - \exp(-z/\lambda)] \qquad (1)$$

Where z is a distance from an Si/SiO$_2$ interface, and λ is a constant which is determined by effective mass of electron, etc. Various methods similar to the Hansch et al.'s method have been proposed. However, in all such methods, the electron density nQM being calculated quantum-mechanically is approximated by use of a function of the electron density nCONV being calculated classically and a distance z from the Si/SiO$_2$ interface. Such methods are inferior in strictness to the case where the Schrodinger equation is solved, but they can give sufficiently good approximation in practical use. In addition, a time required for calculation is small rather than the case where the Schrodinger equation is solved, and two-dimensional or three-dimensional calculation can be facilitated.

However, a thickness of the inversion layer is 6 to 8 nm whereas λ in Eq.(1) is about 1 nm. Hence, there is necessity of employing a discretization mesh which has a very fine distance like 0.1 nm in the silicon substrate region which ranges from the Si/SiO$_2$ interface to a 6 to 8 nm depth. In contrast, normally an about 2 to 4 nm distance is enough for the discretization mesh necessary for calculation of the classical theory. In brief, if the methods which are represented by W. Hansch et al. are employed, discretization mesh points which are more than twenty times those required for the calculation based on the classical theory are required, and thus a calculation time is extended correspondingly.

In addition, as the third technology in the prior art, there is a method which has been proposed by Y. Ohkura as another approximate solution (Y. Ohkura, "Quantum Effects in Si n-MOS Inversion Layer at High Substrate Concentration", Solid-State Elec., 33, 1581 (1990)). The method proposed by Y. Ohkura is that, although the solved equation in the classical theory is still used in calculation as it is, ToxMD given by Eq.(2) is employed in calculation instead of the oxide film thickness Tox in the actual device as the thickness of the gate oxide film and also VFBMD given by Eq. (3) is employed in calculation instead of VFB as the flat band voltage. The VFB can be determined by the substrate concentration of the actual device and material of the gate electrode.

$$ToxMD = Tox + \epsilon ox \Delta z / \epsilon Si \quad (2)$$

$$VFBMD = VFD + qNA(\Delta z/2\epsilon Si + Tox/\epsilon ox)\Delta z \quad (3)$$

Where $\epsilon Si$ is a dielectric constant of silicon, $\epsilon ox$ is a dielectric constant of the gate oxide film, $\Delta z$ is a parameter representing difference in the inversion layer capacitance between the classical theory and the quantum theory, q is an elementary charge, and NA is an acceptor concentration in the semiconductor substrate.

According to the third technology in the prior art, though the calculation is a coarse approximation, it has sufficient precision in practical use. In addition, since the discretization mesh is not needed to be formed fine in the vicinity of the $Si/SiO_2$ interface and also the same discretization mesh as that used in the normal simulator based on the classical theory may be used, the third technology is excellent in respect of the calculation time. However, as expressed by Eq.(3), the corrected flat band voltage VFBMD is represented as a function of the impurity concentration NA in the semiconductor substrate. No problem is caused if the impurity distribution in the semiconductor substrate can be regarded as a uniform distribution. In numerous cases, since impurity introduction into the channel region by virtue of the ion implantation method is performed to define a threshold voltage after the well region has been formed in the actual device, the impurity distribution in the semiconductor substrate becomes non-uniform. For this reason, it is difficult to consider the quantum-mechanical effect for the actual device according to the Y. Ohkura's method.

Further, as the fourth technology in the prior art, there is a method which has been proposed by Tanimoto and which uses discretization performance to solve numerically the equation based on the classical theory as still another approximate solution (Tanimoto, Patent Application Publication (KOKAI) Hei 4-48744). According to this method, in the device simulator based on the classical theory with the use of a Voronoi discretization mesh, a thickness of the semiconductor (several nm) equivalent to difference in the inversion layer capacitance between the classical theory and the quantum theory is calculated, then a discretization mesh which has mesh points being closest to a semiconductor/gate insulating film interface at locations remote from the semiconductor/gate insulating film interface by the same distance as the thickness of the semiconductor equivalent to the difference in the inversion layer capacitance is set in the semiconductor, and then the quantum-mechanical inversion layer capacitance can be taken into account with the use of such discretization mesh. This method is characterized by execution of the Voronoi discretization scheme and the discretization mesh setting method, and nothing other than the above is needed.

The fourth technology in the prior art is identical in calculation time to that in the simulator based on the classical theory and is applicable to the case where the impurity distribution in the semiconductor substrate is not uniform. However, this method has defects because the Voronoi discretization mesh is employed. FIG. 2 is an example of the Delaunay discretization mesh, and FIG. 3 is an example of the Voronoi discretization mesh. In the Delaunay discretization mesh, the discretization mesh points are positioned on the interface between an external electrode and the semiconductor. While, in the Voronoi discretization mesh, the discretization mesh points are not positioned on the interface between the external electrode and the semiconductor. In the Delaunay discretization mesh, while using a discretization equation employing potential on the discretization mesh points positioned on the interface between the external electrode and the semiconductor as an unknown, simulation with regard to an external circuit as shown in FIG. 4 can be carried out. In the case of the Voronoi discretization mesh, as stated above, the discretization mesh points are not positioned on the interface between the external electrode and the semiconductor. Hence, a simulation with regard to a circuit (external circuit) other than a transistor like the circuit shown in FIG. 4 cannot be carried out. For this reason, there has existed the problem that the simulator for executing the Voronoi discretization scheme is inferior in function to the simulator for executing the Delaunay discretization scheme.

SUMMARY OF THE INVENTION

The present invention has been made in light of the above circumstances and it is an object of the present invention to provide an electrical parameter evaluation system, an electrical parameter evaluation method, and a computer-readable recording medium for recording an electrical parameter evaluation program which are capable of evaluating electrical parameters of MISFET with the use of the Delaunay discretization scheme, which can take the quantum-mechanical effect in account approximately by a calculation time equivalent to that required for the simulator with the use of the classical theory and also can be applied to a case impurity distribution in a semiconductor substrate is not uniform.

In order to achieve the above object, the gist of the electrical parameter evaluation system according to the present invention is that, in the electrical parameter evaluation system (device simulator, etc.) for MISFET based on the classical theory using the Delaunay discretization mesh, a thickness (several nm) of the substrate semiconductor equivalent to difference between an inversion layer capacitance by the classical theory in which the quantum-mechanical effect is disregarded and an inversion layer capacitance by the quantum theory in which the quantum-mechanical effect is considered, then the discretization mesh having the mesh points closest to the interface between the semiconductor and the gate insulating film is generated at positions remote from the interface between the semiconductor and the gate insulating film by the same distance as a thickness of the substrate semiconductor equivalent to difference in the inversion layer capacitance in the semiconductor substrate, then the density of conductivity type carriers (electrons in the case of N-type FET, or holes in the case of P-type FET) forming the channel at the mesh points on the interface between the semiconductor and the gate insulating film is set to zero in place of the density which is decided by potential and the quasi Fermi level, and the conductivity type current density forming the channel between the mesh point and the other mesh point the interface between the semiconductor and the insulating film is set to zero instead of the current density which is decided by carrier density, potential distribution, and carrier mobility, whereby two-dimensional quantization of the carrier in the channel can be taken approximately into account.

As the preferred embodiment of the present invention, there is provided a system for evaluating electrical parameters of a semiconductor device, comprising:

- a $\Delta Z$ calculator for calculating difference between an inversion layer capacitance by a classical theory and an inversion layer capacitance by a quantum theory, calculating $\Delta Z$ which is a thickness of a semiconductor substrate equivalent to the difference in inversion layer capacitance, and storing the $\Delta Z$;
- a discretization mesh generator for generating a Delaunay discretization mesh for a structure of the semiconductor device to be evaluated, and storing the discretization mesh; and
- an electrical parameter calculator for calculating electrical parameters of the semiconductor device under constraint that a charge density of channel conductivity type of the semiconductor device is set to zero at discretization mesh points of the discretization mesh on an interface between an insulating film and the semiconductor substrate and at discretization mesh points of the discretization mesh in the semiconductor substrate which are located within a distance less than the stored $\Delta Z$ from the interface between the insulating film and the semiconductor substrate.

According to the above invention, one-dimensional calculation with taking the quantum-mechanical effect into account approximately can be carried out by the calculation time similar to that in the device simulator operated based on the classical theory in the prior art.

As the preferred embodiment of the present invention, there is provided a method of evaluating electrical parameters of a semiconductor device, comprising:

- a discretization mesh generating step of generating a Delaunay discretization mesh for a structure of the semiconductor device to be evaluated; and
- an electrical parameter calculating step of calculating electrical parameters of the semiconductor device under constraint that a charge density of channel conductivity type of the semiconductor device is set to zero at discretization mesh points of the discretization mesh on an interface between an insulating film and a semiconductor substrate and at discretization mesh points of the discretization mesh in the semiconductor substrate which are located within a distance less than $\Delta Z$ from the interface between the insulating film and the semiconductor substrate, the $\Delta Z$ being a thickness of a semiconductor substrate equivalent to the difference between an inversion layer capacitance by a classical theory and an inversion layer capacitance by a quantum theory.

According to the above invention, one-dimensional calculation with taking the quantum-mechanical effect into account approximately can be carried out by the calculation time similar to that in the device simulator operated based on the classical theory in the prior art. Where the value of $\Delta Z$ may prepared in advance or may be calculated.

As the preferred embodiment of the present invention, there is provided a method of evaluating electrical parameters of a semiconductor device, comprising:

- an inputting step of inputting device structure information of the semiconductor device and channel conductivity type information on an interface between a gate insulating film and a semiconductor substrate as input data;
- an input data storing step of storing the input data;
- a $\Delta Z$ calculating step of calculating difference between an inversion layer capacitance by a classical theory and an inversion layer capacitance by a quantum theory based on the stored input data, and calculating $\Delta Z$ which is a thickness of the semiconductor substrate equivalent to the difference in inversion layer capacitance;
- a $\Delta Z$ storing step of storing the calculated $\Delta Z$;
- a discretization mesh generating step of generating a Delaunay discretization mesh which has discretization mesh points in the semiconductor substrate remote at least from the interface between the gate insulating film and the semiconductor substrate by a distance equal to the $\Delta Z$, using the device structure information;
- an electrical parameter calculating step of calculating electrical parameters of the semiconductor device under constraint that a charge density of channel conductivity type which is input as the input data is set to zero at discretization mesh points of the discretization mesh on the interface between the insulating film and the semiconductor substrate and at discretization mesh points of the discretization mesh in the semiconductor substrate which are located within a distance less than the $\Delta Z$ from the interface between the insulating film and the semiconductor substrate; and
- an outputting step of outputting calculated electrical parameters.

According to the above invention, for the N-type or P-type MISFET, device simulation with taking the quantum-mechanical effect into account approximately can be carried out by the calculation time similar to that in the device simulator operated based on the classical theory in the prior art.

The discretization mesh generating step can set the discretization mesh such that a distance of the discretization mesh points in the semiconductor substrate, which are closest to the interface between the insulating film and the semiconductor substrate except the discretization mesh points on the interface between the insulating film and the semiconductor substrate, from the interface between the insulating film and the semiconductor substrate becomes equal to the $\Delta Z$.

According to the above invention, high speed calculation can be carried out by the lowest minimum discretization mesh to take the quantum-mechanical effect into account approximately.

If a part of the interface between the insulating film and the semiconductor substrate of the semiconductor device is formed of an interface between a gate insulating film and the semiconductor substrate, the inputting step can input device structure information of the semiconductor device and an area of the interface between the gate insulating film and the semiconductor substrate of the interface between the insulating film and the semiconductor substrate as input data.

According to the above invention, for the MISFET having the structure including the interfaces between the semiconductor and the insulating film in addition to the interface between the semiconductor substrate and the gate insulating film, device simulation with taking the quantum-mechanical effect into account approximately can be carried out more effectively by the calculation time similar to that in the device simulator operated based on the classical theory in the prior art.

If the semiconductor device has at least two gate insulating films, the inputting step can input device structure information of the semiconductor device and respective channel conductivity type information on interfaces between at least two gate insulating films and the semiconductor substrate as input data.

According to the above invention, for the semiconductor device having the structure including at least two MISFETs, device simulation with taking the quantum-mechanical effect into account approximately can be carried out more effectively by the calculation time similar to that in the device simulator operated based on the classical theory in the prior art.

The electrical parameter calculating step comprises, a decision step of deciding whether or not two-dimensional quantization of the channel conductivity type charge will occur at the discretization mesh points on the interface, based on an electric field perpendicular to the interface between the insulating film and the semiconductor substrate, and a calculating step of calculating electrical parameters of the semiconductor device under constraint that a charge density of channel conductivity type is set to zero at the discretization mesh points at which it has been decided that the two-dimensional quantization on the interface between the insulating film and the semiconductor substrate will occur and at all discretization mesh points in the semiconductor substrate which are located within a distance less than the $\Delta Z$ from the discretization mesh points at which it has been decided that the two-dimensional quantization will occur.

According to the above invention, device simulation with taking the quantum-mechanical effect into account approximately can be carried out by the calculation time similar to that in the device simulator operated based on the classical theory in the prior art even if the bias condition not to cause two-dimensional quantization is also included.

The decision step decides whether or not two-dimensional quantization of the channel conductivity type charge will occur at the discretization mesh points on the interface, based on the electric field perpendicular to the interface between the insulating film and the semiconductor substrate on a basis of impurity concentration in the semiconductor substrate at the mesh points.

According to the above invention, in the device simulator which can be carried out by the calculation time similar to that in the device simulator operated based on the classical theory in the prior art with taking the quantum-mechanical effect into account approximately, it is decided more precisely whether or not the bias condition corresponds to that two-dimensional quantization of the channel conductivity type charge will not occur or the interface corresponds to that two-dimensional quantization will not occur, so that high precision calculation can be carried out.

If at least one of discretization mesh points corresponds to the discretization mesh points at which the density of the channel conductivity type charge is set to zero, the electrical parameter calculating step can solve a current flow equation under constraint that a current density of the channel conductivity type charge between two discretization mesh points out of the current density between two discretization mesh points necessary for solving a current flow equation numerically is set to zero.

According to the above invention, two-dimensional or three-dimensional calculation with taking the quantum-mechanical effect into account approximately can be carried out by the calculation time similar to that in the device simulator operated based on the classical theory in the prior art.

It is preferable that the $\Delta Z$ calculating step can calculate the $\Delta Z$ based on the electric field perpendicular to the interface between the insulating film and the semiconductor substrate.

According to the above invention, in the device simulator which can be carried out by the calculation time similar to that in the device simulator operated based on the classical theory in the prior art with taking the quantum-mechanical effect into account approximately, high precision calculation which is capable of considering difference from the classical theory for two-dimensional quantization can be carried out.

The $\Delta Z$ calculating step can calculate the $\Delta Z$ at respective discretization mesh points with regard to an event that the electric field perpendicular to the interface between the insulating film and the semiconductor substrate has a dependency on locations.

According to the above invention, in the device simulator which can be carried out by the calculation time similar to that in the device simulator operated based on the classical theory in the prior art with taking the quantum-mechanical effect into account approximately, high precision calculation which is capable of considering difference from the classical theory for two-dimensional quantization can be carried out.

The $\Delta Z$ calculating step comprises, a step of calculating $\Delta Z$ in connection with electrons at respective mesh points, with regard to an event that the electric field perpendicular to the interface between the insulating film and the semiconductor substrate has a dependency on locations, and a step of calculating $\Delta Z$ in connection with holes at respective mesh points, with regard to the event that the electric field perpendicular to the interface between the insulating film and the semiconductor substrate has a dependency on locations.

According to the above invention, in the device simulator which can be carried out by the calculation time similar to that in the device simulator operated based on the classical theory in the prior art with taking the quantum-mechanical effect into account approximately, high precision calculation can be carried out with respect to both the N-type FET and the P-type FET.

The electrical parameter calculating step can calculate the electrical parameters by solving a current flow equation under constraint that a charge generation or recombination rate in the semiconductor substrate, in which the distance from the interface between the insulating film and the semiconductor substrate is less than the $\Delta Z$, is set to zero.

According to the above invention, in the device simulator which can be carried out by the calculation time similar to that in the device simulator operated based on the classical theory in the prior art with taking the quantum-mechanical effect into account approximately, calculation which is able to consider influence of generation or recombination of the charge can be carried out.

It is preferable that the electrical parameter calculating step can solve a Poisson equation under an assumption that the interface having interface trap states locates at a position which is remote from the interface between the insulating film and the semiconductor substrate by the distance being equal to the $\Delta Z$.

According to the above invention, in the device simulator which can be carried out by the calculation time similar to that in the device simulator operated based on the classical theory in the prior art with taking the quantum-mechanical effect into account approximately, calculation which is able to consider influence of the interface states at the interface between the semiconductor and the insulator can be carried out.

It is preferable that the electrical parameter calculating step can solve a Poisson equation and a current flow equation under an assumption that the interface having interface states locates at a position which is remote from the interface between the insulating film and the semiconductor substrate by the distance being equal to the $\Delta Z$.

According to the above invention, in the device simulator which can solve Poisson and current flow equations with taking the quantum-mechanical effect into account approximately, by the calculation time similar to that in the device simulator operated based on the classical theory in the prior art, calculation which is able to consider influence of the interface trap states at the interface between the semiconductor and the insulator can be carried out.

It is preferable that the electrical parameter calculating step comprises, a step of replacing a semiconductor substrate area on the interface between the insulating film and the semiconductor substrate having a thickness of the semiconductor substrate equivalent to difference in inversion layer capacitance in the device structure to be evaluated with virtual material under an assumption that the virtual material having the same physical properties as the semiconductor substrate except that the charge density of the channel conductivity type is always zero can be considered, and a step of performing the electrical parameter evaluation of the device structure based on the classical theory.

According to the above invention, one-dimensional calculation with taking the quantum-mechanical effect into account approximately can be carried out more easily by the calculation time similar to that in the device simulator operated based on the classical theory in the prior art.

It is preferable that the electrical parameter calculating step comprises, a step of supposing virtual material having same properties as the substrate semiconductor except that channel conductivity type charge density is always zero and channel conduction type charge current density is zero, and replacing a semiconductor substrate region on the interface between the semiconductor substrate and the insulating film having a thickness equal to a thickness of the semiconductor substrate equivalent to difference in the inversion layer in the device structure to be evaluated with the virtual material, and a step of executing electrical parameter evaluation of the device structure based on the classical theory.

According to the above invention, two-dimensional or three-dimensional device simulation with taking the quantum-mechanical effect into account approximately can be carried out more easily by the calculation time similar to that in the device simulator operated based on the classical theory in the prior art.

It is preferable that the insulating film is a gate insulating film.

According to the above invention, one-, two- or three-dimensional device simulation with taking the two-dimensional quantization of the charge on the interface between the semiconductor substrate and the gate insulating film into account approximately can be carried out by the calculation time similar to that in the device simulator operated based on the classical theory in the prior art.

As the preferred embodiment of the present invention, there is provided a computer-readable recording medium for recording the electrical parameter evaluation program, comprising:

a discretization mesh generating step of generating a Delaunay discretization mesh for a structure of the semiconductor device to be evaluated; and an electrical parameter calculating step of calculating electrical parameters of the semiconductor device under constraint that a charge density of channel conductivity type of the semiconductor device is set to zero at discretization mesh points of the discretization mesh on an interface between an insulating film and a semiconductor substrate and at discretization mesh points of the discretization mesh in the semiconductor substrate which are located within a distance less than $\Delta Z$ from the interface between the insulating film and the semiconductor substrate, the $\Delta Z$ being a thickness of a semiconductor substrate equivalent to the difference between an inversion layer capacitance by a classical theory and an inversion layer capacitance by a quantum theory.

According to the above invention, the above methods according to the above present invention can be described as the computer program, and the computer program can be saved in the recording medium. The electrical parameter evaluation method can be carried out while controlling the computer, by causing the computer system to read the recording medium and to thus execute the program.

DETAILED DESCRIPTION OF THE EMBODIMENTS

Various embodiments of an electrical parameter evaluation system, an electrical parameter evaluation method, and a computer-readable recording medium for recording an electrical parameter evaluation program according to the present invention will be explained in detail with reference to the accompanying drawings hereinafter.

As a hardware configuration of the electrical parameter evaluation system according to the present invention, a normal computer system which comprises a CPU for executing various processes, an input device such as a keyboard, a mouse, a light pen, or a flexible disk device, an external memory device such as a memory device, or a disk device, an output device such as a display device, or a printer device, and the like may be employed. The CPU comprises an arithmetic section for executing processes in respective steps described later, and a main memory section for storing instructions for the above processes. Accordingly, in the electrical parameter evaluation system according to the present invention, the CPU advances processes in respective steps described later, while saving data used in process procedures, etc. into the external memory device, etc. for the processes in the electrical parameter evaluation method described later.

(First Embodiment)

Figure 5:
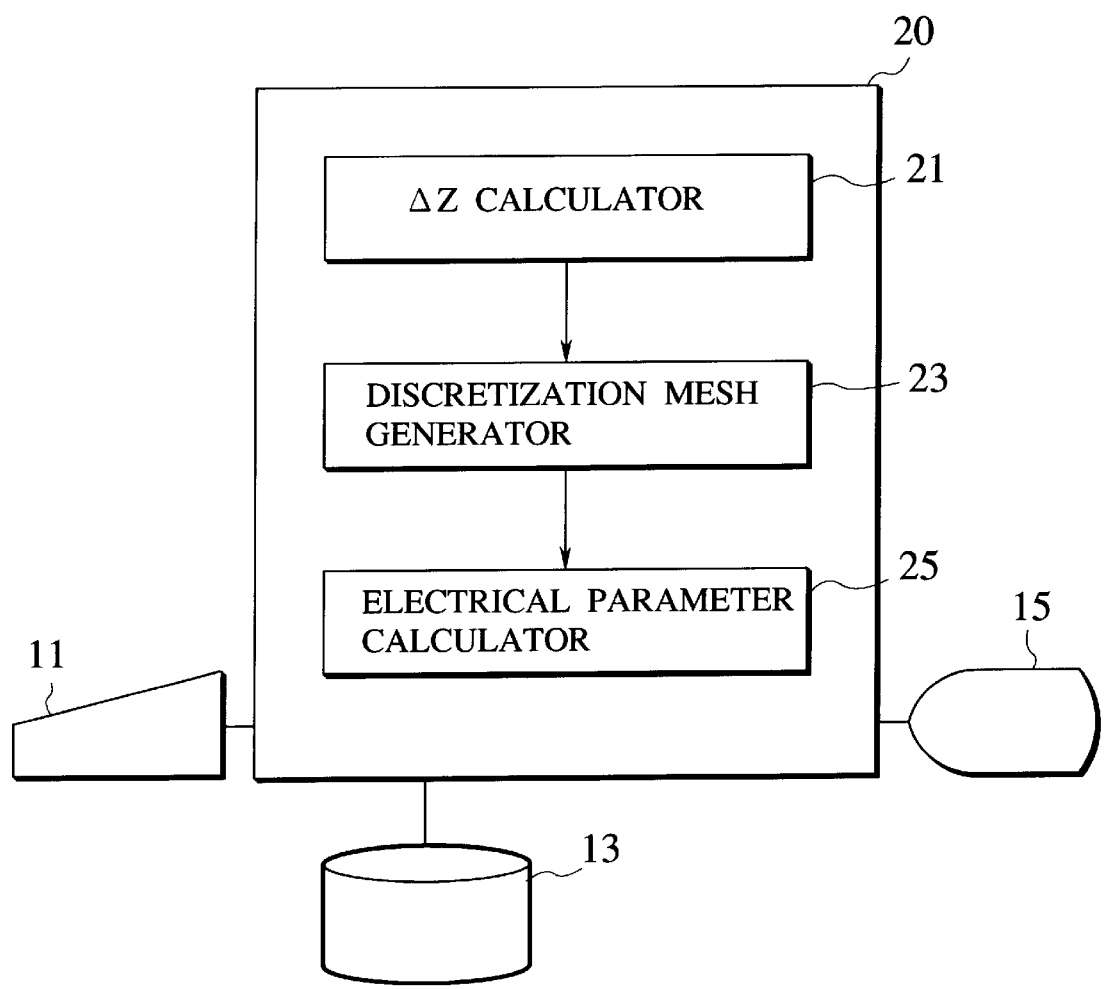
FIG. 5 is a block diagram showing an electrical parameter evaluation system according to the present invention.

FIG. 5 is a block diagram showing an electrical parameter evaluation system according to the present invention. The electrical parameter evaluation system can input device structure information of a semiconductor device and channel conductivity type information on an interface between a gate insulating film and a semiconductor substrate from an inputting means 11 as input data, store the input data into a memory means 13, calculate difference between an inversion layer capacitance by the classical theory and an inversion layer capacitance by the quantum theory and calculate $\Delta Z$ which is a thickness of the semiconductor substrate equivalent to the difference in inversion layer capacitance by a $\Delta Z$ calculator 21, and store the $\Delta Z$ into the memory means 13. Then, the electrical parameter evaluation system can generate the Delaunay discretization mesh for the structure of the semiconductor device to be evaluated by a discretization mesh generator 23, and then store the discretization mesh into the memory means 13. Then, the electrical parameter evaluation system can calculate, by an electrical parameter calculator 25, electrical parameters of the semiconductor device under constraint that a channel conductivity type charge density of the semiconductor device is set to zero at discretization mesh points of the discretization mesh on the interface between the insulating film and the semiconductor substrate and at discretization mesh points of the discretization mesh in the semiconductor substrate which are located within a distance less than the $\Delta Z$ from the interface between the insulating film and the semiconductor substrate, and output calculated electrical parameters into an outputting means 15.

Figure 6:
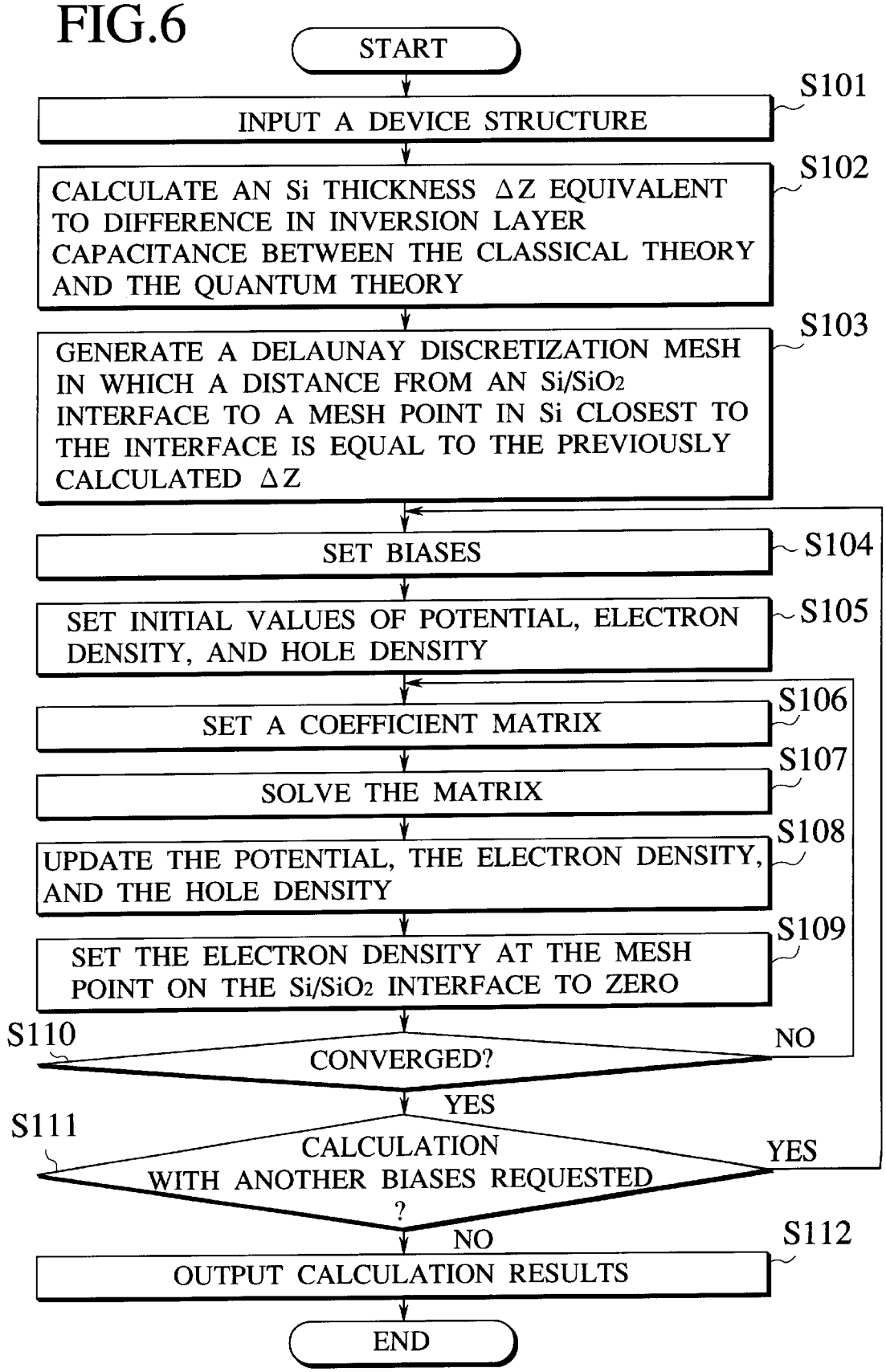
FIG. 6 is a flowchart showing an electrical parameter evaluation method according to a first embodiment of the present invention.

As a first embodiment of the present invention, one-dimensional electrical parameter evaluation method of evaluating electrical parameters of the Si N-type MOSFET will be explained. FIG. 6 is a flowchart of a software according to the first embodiment of the present invention. In this flowchart, processes for discretizing the Poisson equation into discretization mesh points, linearizing the equation in an infinitesimal correction amount, setting a coefficient matrix to calculate the infinitesimal correction amount, and detecting the infinitesimal correction amount by solving the matrix problem are repeated until potential, etc. have converged.

First, a device structure whose electrical parameters are to be evaluated is input (step S101). In this step, profiles calculated by a process simulator, etc. can be input. As another input method, the operator can input directly device profiles into the above computer system via the input device such as the mouse. In turn, an Si thickness (referred to as "$\Delta Z$" hereinafter) equivalent to difference in inversion layer capacitance between the classical theory and the quantum theory is calculated (step S102). In this step, calculation may be carried out actually, but a certain value may be prepared in advance. For example, such an approximation may be employed that $\Delta Z$ is not dependent upon the device structure or biases applied to the device and is thus a constant value. For example, a value of 1.7 nm may be employed herein.

Figure 7:
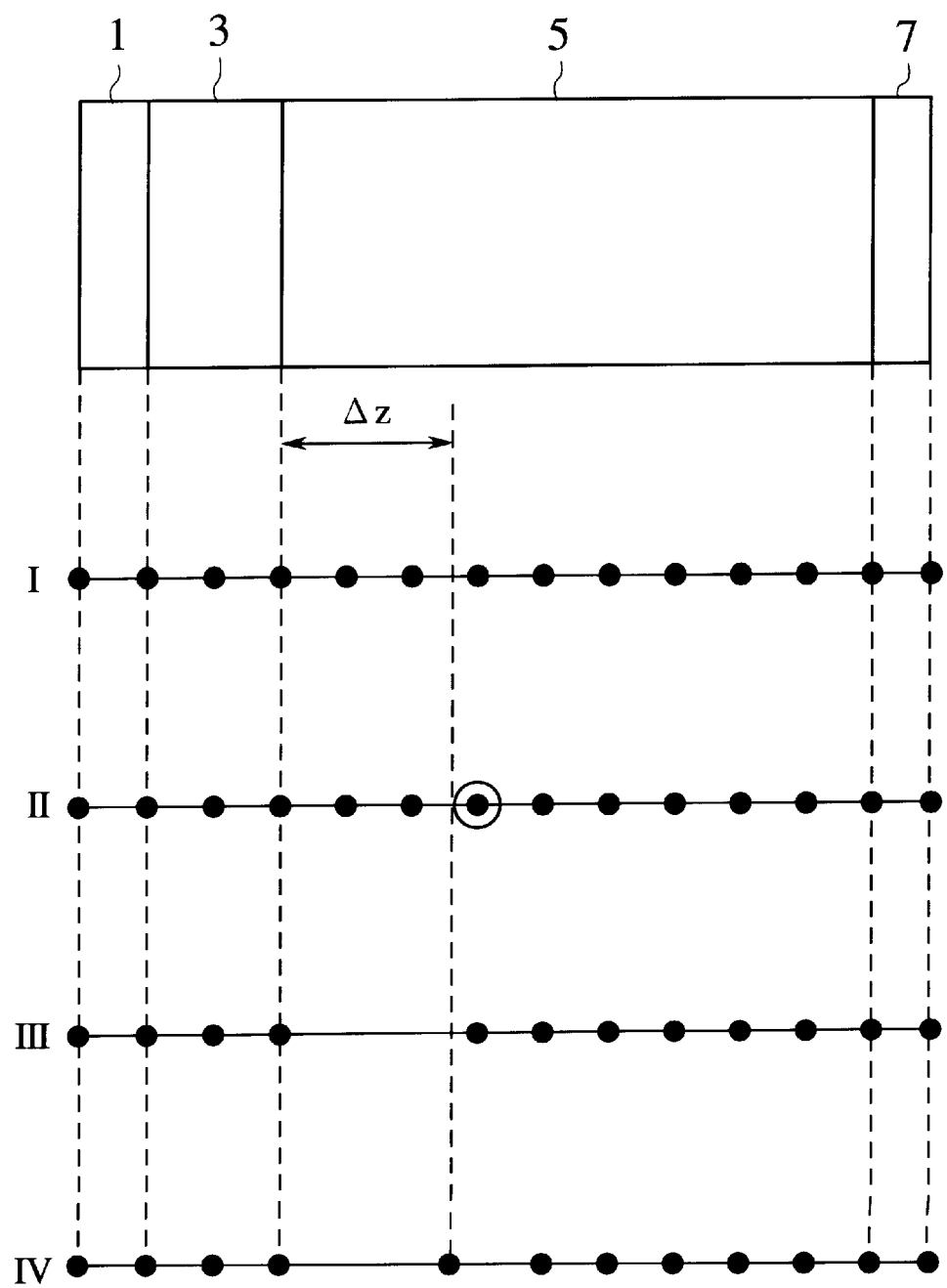
FIG. 7 is a schematic view showing procedures in step S103 in the flowchart in FIG. 6.

Then, a Delaunay discretization mesh in which a distance from an Si/SiO$_2$ interface to a mesh point in Si closest to the interface is equal to the previously calculated $\Delta Z$ is generated (step S103). FIG. 7 is a view showing states of the discretization mesh to explain procedures in step S103 on a time series base. A part of an N-type MOSFET which has a gate electrode 1, a gate oxide film 3, an Si substrate 5, and a substrate electrode 7 is shown herein. At first, the discretization mesh for the N-type MOSFET is generated by the well known method (phase I). Then, a mesh point in the Si substrate which is closest to the position of $\Delta Z$ set in step S102 from the interface (Si/SiO$_2$ interface) between the oxide film 3 and the Si substrate 5 is searched (a point enclosed with a circle in phase II), and then mesh points within the range from the Si/SiO$_2$ interface to the searched mesh point are deleted (phase III). Finally, the previously searched mesh point is shifted such that a distance from the interface becomes equal to $\Delta Z$ (phase IV). According to the above procedures, the discretization mesh in which a distance to mesh points in Si is equal to the previously calculated $\Delta Z$ can be generated.

Subsequently, biases such as a gate voltage, drain voltage, etc. are set (step S104). Initial values of potential, electron density, and hole density are set at respective discretization mesh points (step S105). In turn, a coefficient matrix is set with the use of set potential, and the like (step S106). Then, the set matrix is solved (step S107). Then, the potential, the electron density, and the hole density all being set previously are updated to new solutions detected by solving the matrix (step S108).

Next, the electron density at the mesh point on the Si/SiO$_2$ interface is set to zero (step S109). In this process, zero is substituted into a variable which means the electron density at the mesh points on the Si/SiO$_2$ interface. In this embodiment, since the electrical parameter evaluation of the N-type MOSFET is performed, the electron density has been set to zero. If the electrical parameter evaluation of the P-type MOSFET is performed, hole density may be set to zero.

Then, it is determined whether or not newly calculated potential, etc. have been converged (step S110). Unless they have been converged, the process returns to step S106 again, then the coefficient matrix is set, then the matrix is solved, and then the potential, etc. are updated (steps S106 to S109). Conversely, if they have been converged, it is determined whether or not the calculation with another biases are requested (step S111). If requested, the process returns to step S104.

Like the above, in steps S104 to S110, processes for discretizing the Poisson equation into discretization mesh points, linearizing the equation in the infinitesimal correction amount, setting the coefficient matrix to calculate the infinitesimal correction amount, and detecting the infinitesimal correction amount by solving the matrix problem are repeated until potential, etc. have converged.

If all necessary biases have been calculated, calculation results are output (step S112) and then the processes are ended.

Figure 8:
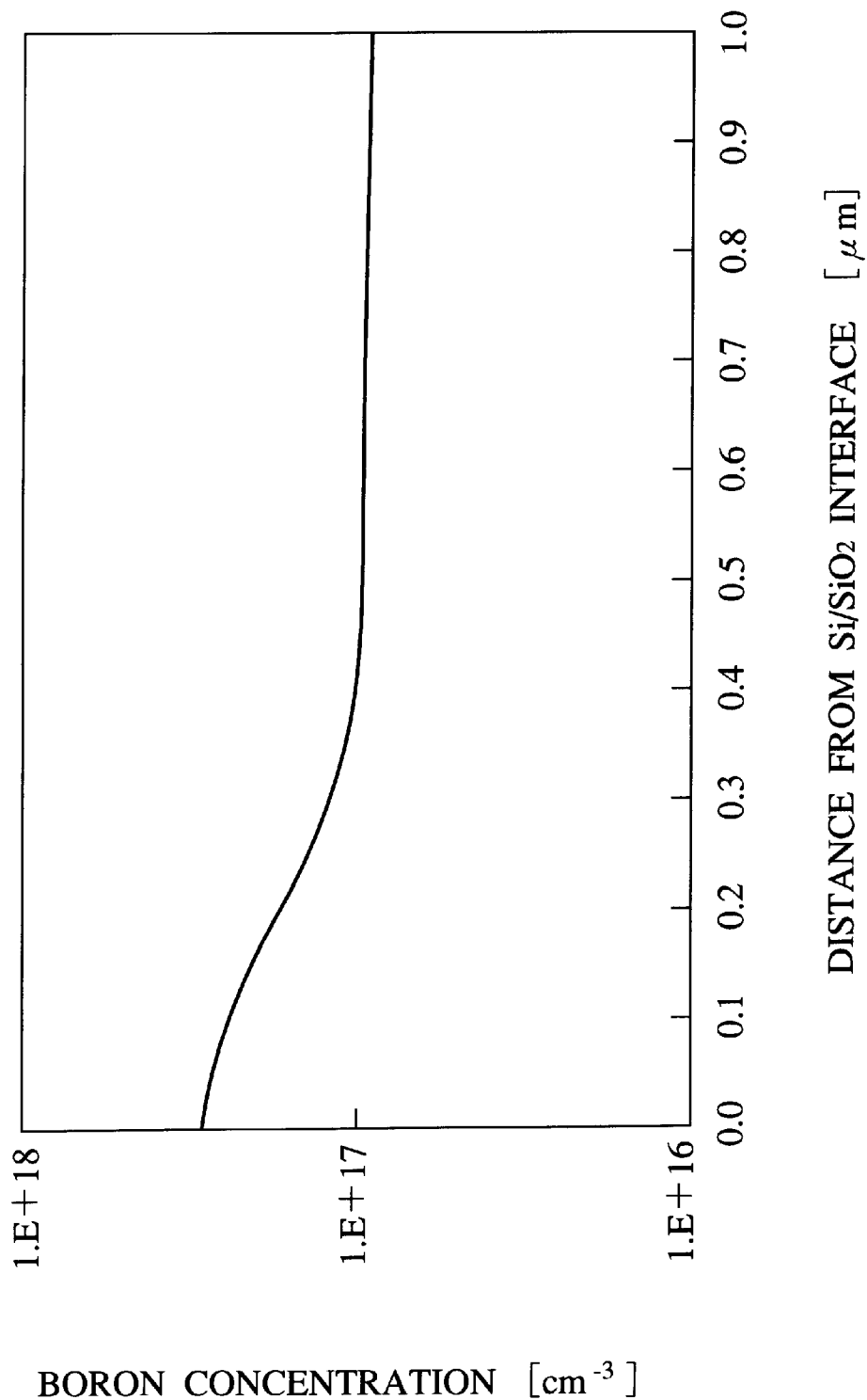
FIG. 8 is a graph showing a boron distribution in an N-type MOSFET which is used in an example showing calculation precision of a device simulation implemented according to the first embodiment.

The results of one-dimensional electrical parameter evaluation achieved according to the flowchart explained above is shown in the following. The structure of the device used in calculation has a 8 nm thick gate oxide film, an N-type polysilicon gate electrode, and an aluminum substrate electrode. Boron distribution shown in FIG. 8 is employed as impurity distribution in the silicon substrate. As the condition of the applied voltage, the substrate voltage is set to 0 V, −2 V, −4 V respectively, and the gate voltage is changed for respective substrate voltages at a pitch of 0.1 V. As the thickness ΔZ of Si equivalent to the difference in the inversion layer capacitance between the classical theory and the quantum theory, the value of 1.7 nm has been employed.

Figure 9:
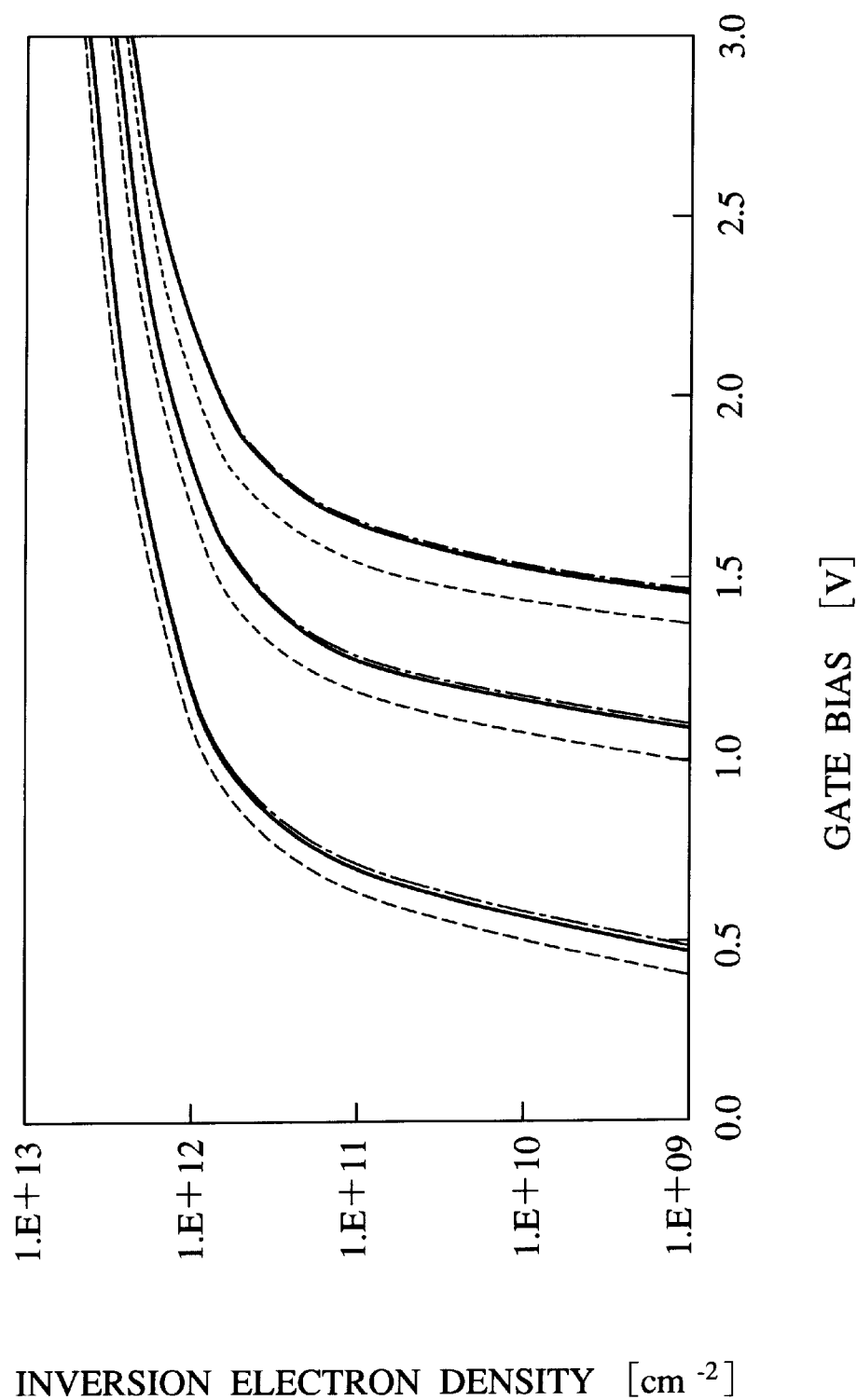
FIG. 9 is a graph showing calculation results of the electrical parameter evaluation according to the first embodiment of the present invention and the prior art.

The results of the electrical parameter evaluation according to the first embodiment are shown in FIG. 9. Solid lines in FIG. 9 are dependency of the inverted electron density on the gate voltage which are calculated by use of the electrical parameter evaluation method according to the first embodiment. Dot-dash lines in FIG. 9 are strict solutions which are calculated by solving the Schrodinger equation and the Poisson equation in a self-consistent manner. Broken lines are calculation results based on the classical theory in the prior art, which is shown in comparison with the results according to the first embodiment. It is understood from FIG. 9 that the calculation results of the electrical parameter evaluation method according to the first embodiment shown by the solid lines substantially coincide with the dot-dash lines as the strict solutions rather than the calculation results based on the classical theory shown by the broken lines and therefore, according to the first embodiment, high precision calculation, which is equivalent to the case where the Schrodinger equation is solved, can be achieved by the calculation time identical to that based on the classical theory.

(Second Embodiment)

Figure 10:
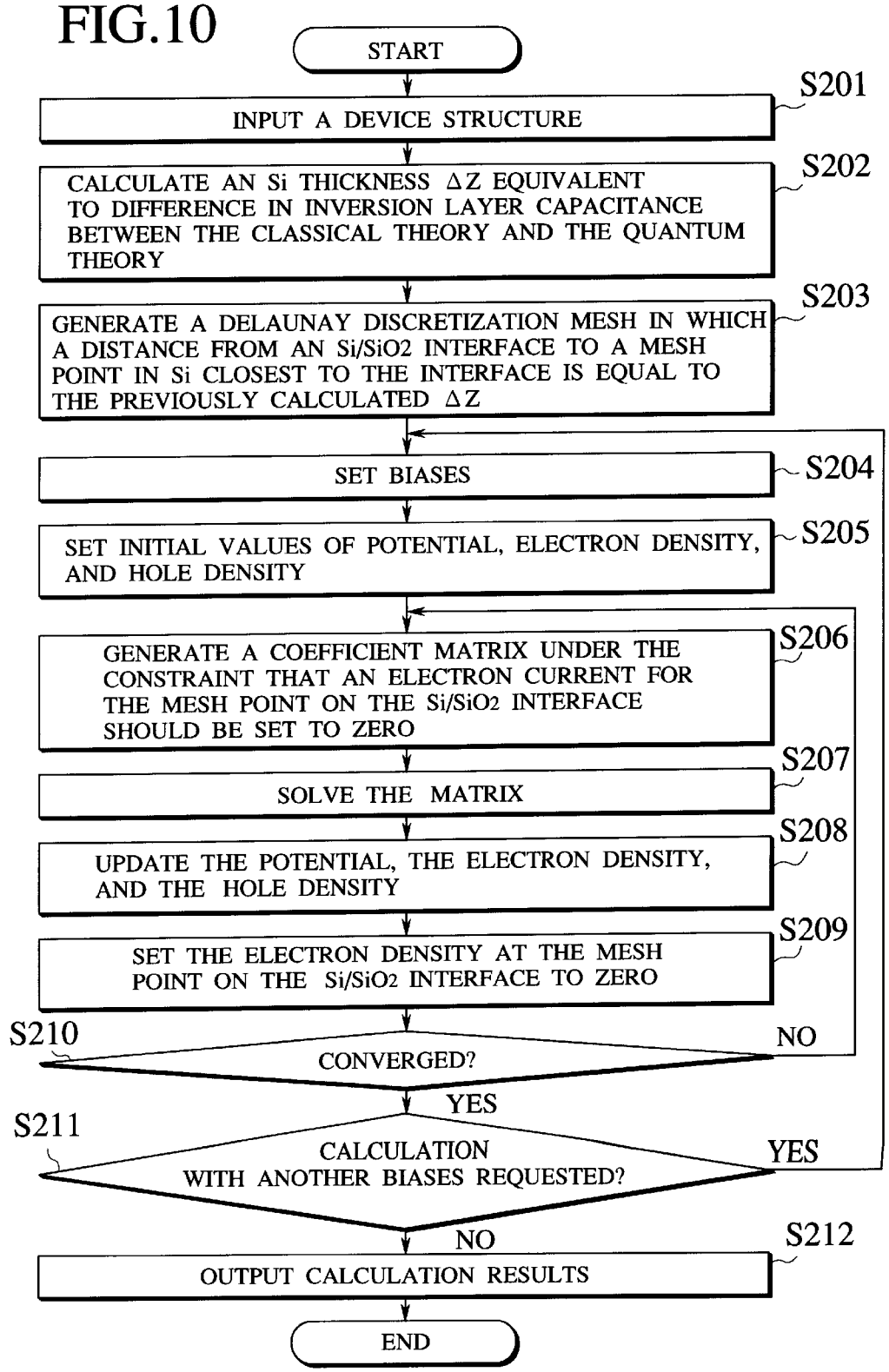
FIG. 10 is a flowchart showing an electrical parameter evaluation method according to a second embodiment of the present invention.

Next, an electrical parameter evaluation method according to a second embodiment of the present invention will be explained with reference to FIGS. 10 and 11. As has been shown in the first embodiment, one-dimensional MISFET device simulation may be carried out by solving the Poisson equation. However, in order to execute two-dimensional or three-dimensional electrical parameter evaluation, not only the Poisson equation but also an electron or hole continuous equation (current flow equation) must be solved. As an example to implement the above, a flowchart for two-dimensional analysis of the N-type MOSFET is shown in FIG. 10. The flowchart illustrative of the second embodiment differs from the flowchart illustrative of the first embodiment only in the process in step S206. Accordingly, the process in step S206 which generates the coefficient matrix under an assumption that electron current of the mesh points on the Si/SiO$_2$ interface is set to zero will be explained in the second embodiment. For the sake of simplicity, while taking two-dimensional equally-spaced rectangular mesh shown in FIG. 11 as an example, the case where no electron generation/recombination is caused will be explained.

Figure 11:
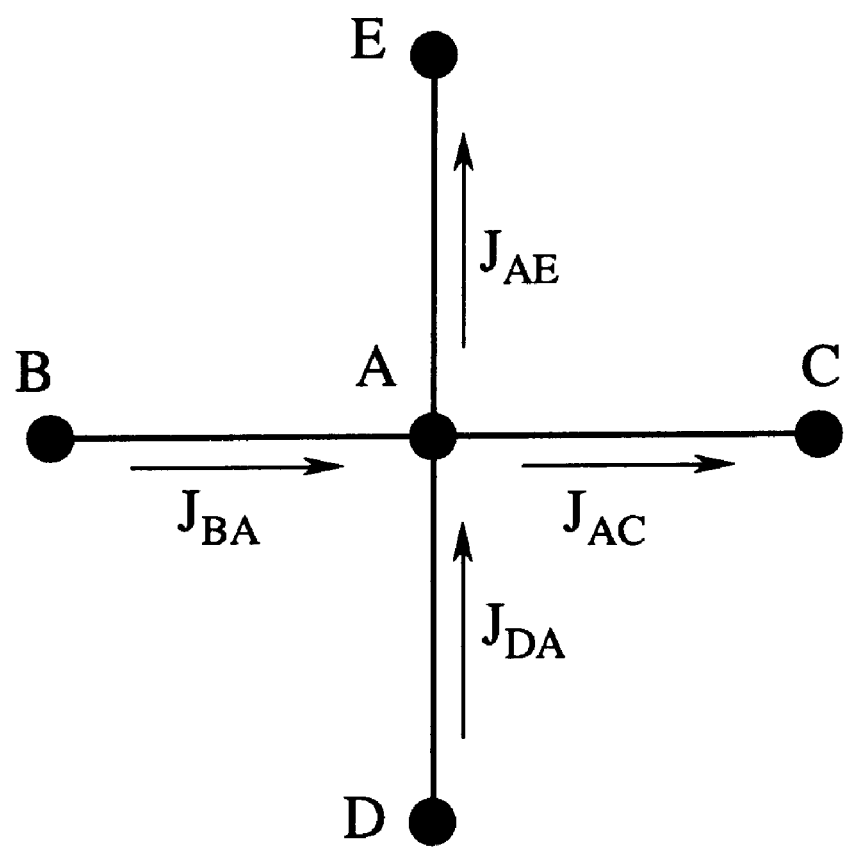
FIG. 11 is a schematic view showing procedures in step S206 in the flowchart in FIG. 10.

First, in FIG. 11, assume that a mesh point B is a mesh point on the Si/SiO$_2$ interface, mesh points A, C, D, E are mesh points in the Si substrate, and the coefficient matrix at the mesh point A is set. Electron conservation at the mesh point A can be expressed by Eq.(4).

$$J_{BA} - J_{AC} + J_{DA} - J_{AE} = 0 \quad (4)$$

Where $J_{BA}$ is electron current density flowing from the mesh point B to the mesh point A, $J_{AC}$ is electron current density flowing from the mesh point A to the mesh point C, $J_{DA}$ is electron current density flowing from the mesh point D to the mesh point A, and $J_{AE}$ is electron current density flowing from the mesh point A to the mesh point E. For example, JBA can be represented by electrostatic potential and the electron density at the mesh points B and A. Since the electron current for the mesh point B on the Si/SiO$_2$ interface is set to zero in the present invention, Eq. (5) is employed in place of Eq. (4) in this example under the assumption that the electron current $J_{BA}$ for the mesh point B as the mesh point on the Si/SiO$_2$ interface is set to zero.

$$-J_{AC} + J_{DA} - J_{AE} = 0 \quad (5)$$

According to this process, numerical solutions to satisfy the electron conservative law can be obtained at the mesh points other than the mesh points on the Si/SiO$_2$ interface even if the electron density for the mesh point on the Si/SiO$_2$ interface is set to zero in step S209.

(Third Embodiment)

Figure 12:
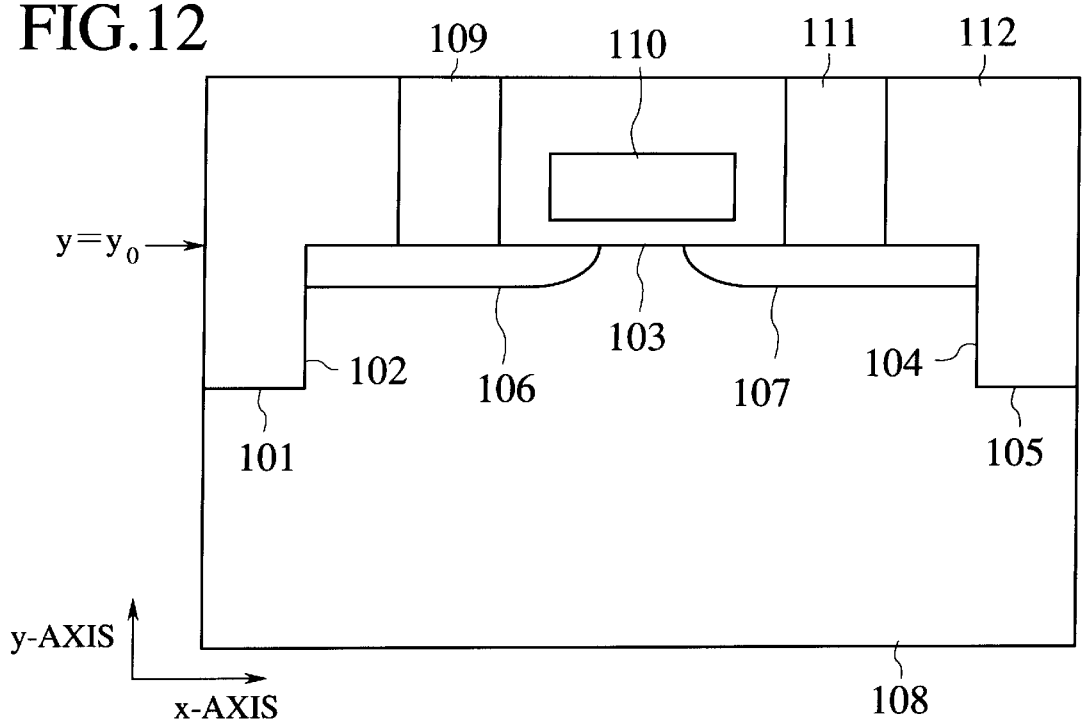
FIG. 12 is a schematic sectional view showing a device for use in an electrical parameter evaluation method according to a third embodiment of the present invention.

Next, an electrical parameter evaluation method according to a third embodiment of the present invention will be explained with reference to FIG. 12. In the third embodiment, the case where electrical parameters of a device shown in FIG. 12 are calculated numerically will be thought of. The device shown in FIG. 12 has the interface between the insulator and the semiconductor substrate 108 from an interface 101 to an interface 105. Out of these interfaces, the interface between the gate oxide film and the semiconductor substrate 108 is the interface 103. Therefore, two-dimensional quantization of the carrier occurs at the interface 103, nevertheless two-dimensional quantization does not occur at remaining interfaces. As a result, a two-dimensional quantization effect must be considered only at the interface 103 between the insulator and the semiconductor substrate 108.

If the present invention is applied partially, for example, procedures will be taken as follows. As shown in FIG. 12, an x-axis is set on an abscissa and a y-axis is set on an ordinate and then such an instruction that the interface between the insulator and the semiconductor substrate 108, at which two-dimensional quantization is to be considered, is present at position of $y=y_0$ is input as input data in step S201 wherein the device structure is to be input. Thereby, the interface 103 between the insulator and the semiconductor substrate 108 is recognized as the interface between the gate insulating film and the semiconductor and thus the processes shown in the second embodiment may be performed only at such designated interface.

Like the above, by applying partially the present invention as in the third embodiment of the present invention, the electrical parameter evaluation can be carried out with the same precision as those in the above embodiments in a shorter process time.

(Fourth Embodiment)

Next, an electrical parameter evaluation method according to a fourth embodiment of the present invention will be explained with reference to FIG. 13. In the fourth embodiment, the case where electrical parameters of a CMOS inverter circuit shown in FIG. 13 are calculated numerically will be discussed.

Figure 13:
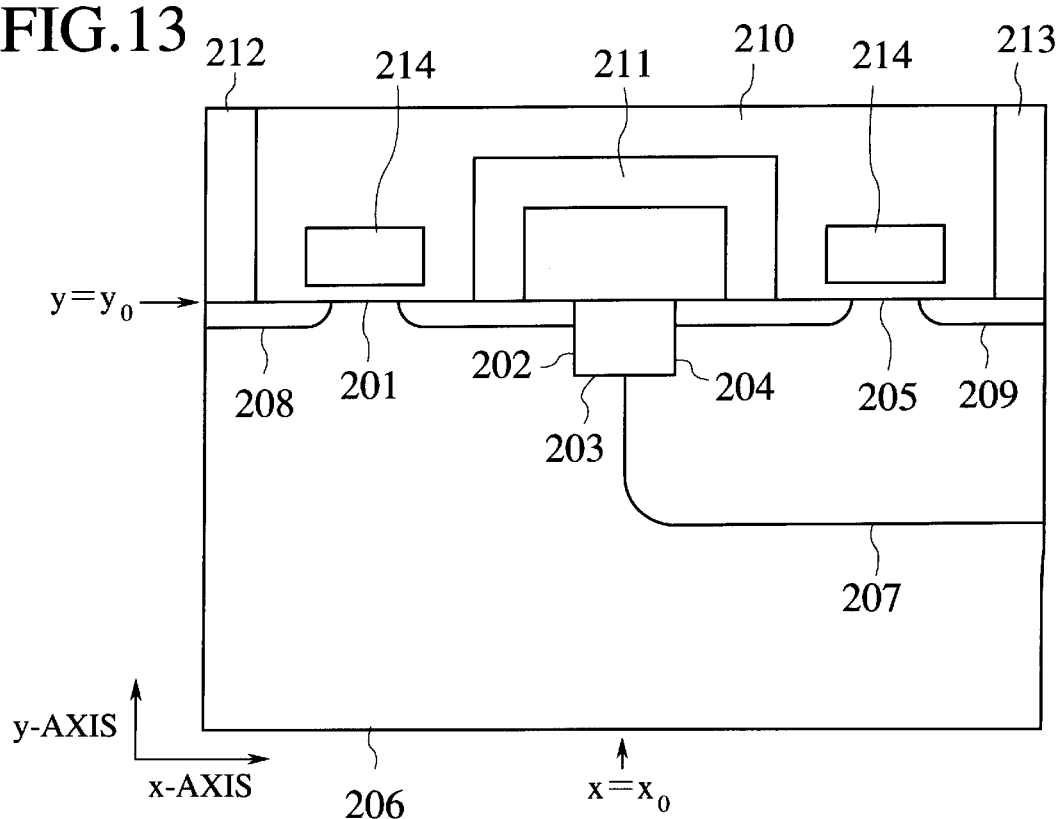
FIG. 13 is a schematic sectional view showing a device for use in an electrical parameter evaluation method according to a fourth embodiment of the present invention.

There exist interfaces 201 to 205 between the insulator and the semiconductor substrate in FIG. 13. Out of these interfaces 201 to 205, the interfaces 201 and 205 correspond to the interface between the gate oxide film and the semiconductor substrate. Hence, two-dimensional quantization of the carrier occurs at the interfaces 201 and 205 whereas no two-dimensional quantization occurs at remaining interfaces. In addition, since a reference 201 denotes a gate oxide film of the N-type FET using the electrons as the carrier and a reference 205 denotes a gate oxide film of the P-type FET using the holes as the carrier, two-dimensional quantization of the electrons occurs at the gate oxide film 201 while two-dimensional quantization of the holes occurs at the gate oxide film 205. As a consequence, the two-dimensional quantization effect should be considered only at the interfaces 201 and 205.

The electrical parameter evaluation to calculate electrical parameters of such device numerically will be performed in the following, for example. As shown in FIG. 13, an x-axis is set on an abscissa and a y-axis is set on an ordinate and then such an instruction that the interface between the insulator and the semiconductor substrate, at which two-dimensional quantization of the electrons is to be considered, is present at position of $y=y_0$ and $x<x_0$ and the interface between the insulator and the semiconductor substrate, at which two-dimensional quantization of the holes is to be considered, is present at position of $y=y_0$ and $x>x_0$ is input as input data in step S201 wherein the device structure is to be input. Thereby, the electrical parameter evaluation system according to the fourth embodiment can recognize that, in FIG. 12, the interface 201 between the insulator and the semiconductor substrate corresponds to the interface between the gate insulating film and the semiconductor, at which two-dimensional quantization of the electrons occurs, and the interface 205 between the insulator and the semiconductor substrate corresponds to the interface between the gate insulating film and the semiconductor, at which two-dimensional quantization of the holes occurs, and thus can perform the processes for the electrons and the holes shown in the second embodiment of the present invention at such designated interfaces 201 and 205 respectively. In this manner, by applying partially the present invention as in the fourth embodiment of the present invention, the electrical parameter evaluation can be carried out with the same precision as those in the above embodiments in a shorter process time.

(Fifth Embodiment)

Figure 14:
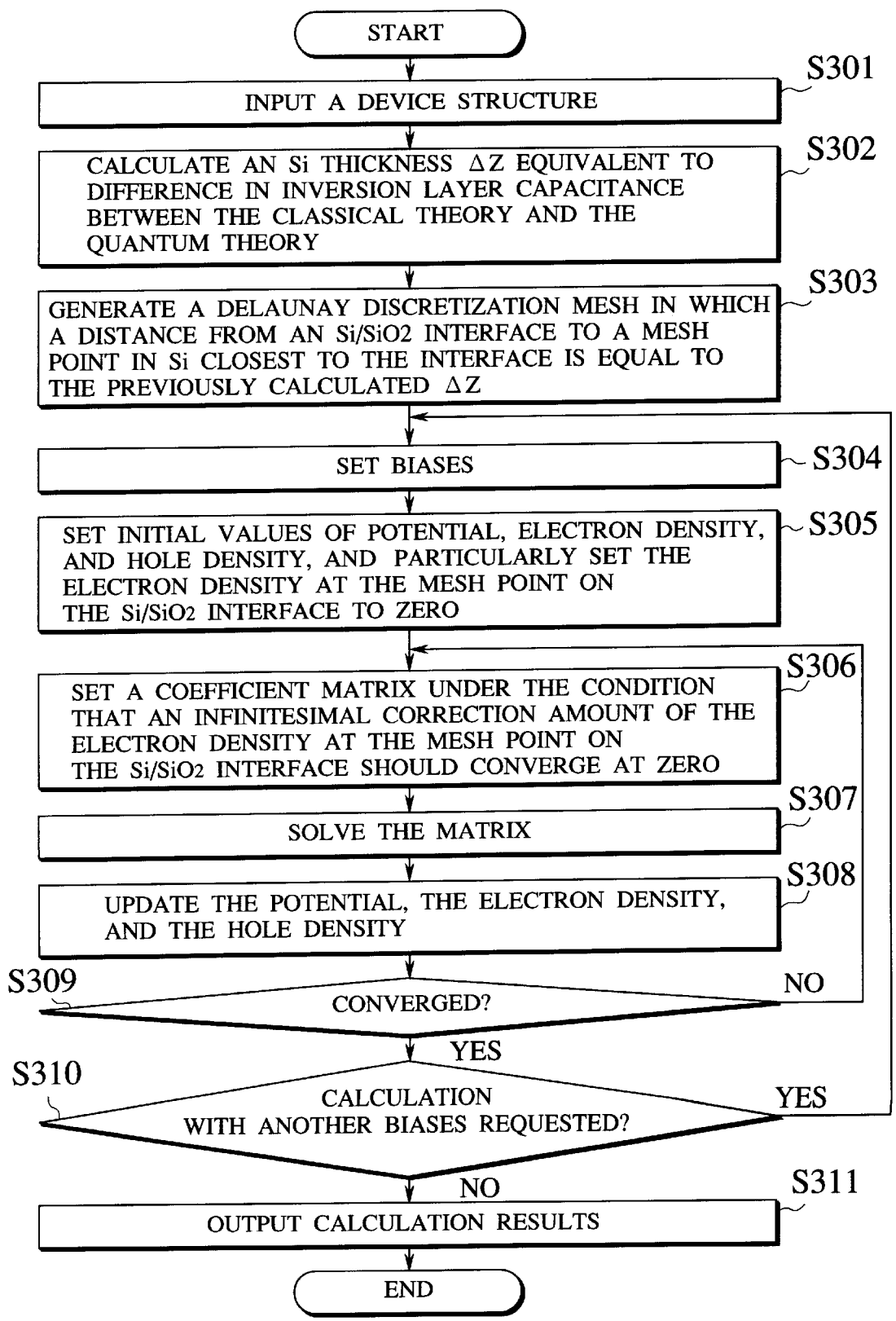
FIG. 14 is a flowchart showing an electrical parameter evaluation method according to a fifth embodiment of the present invention.

Subsequently, an electrical parameter evaluation method according to a fifth embodiment of the present invention will be explained with reference to FIG. 14. In the fifth embodiment, one-dimensional electrical parameter evaluation method which can evaluate electrical parameters of an Si N-type MOSFET will be considered. FIG. 14 is a flowchart showing the electrical parameter evaluation method according to the fifth embodiment. In this flowchart, processes for discretizing the Poisson equation into discretization mesh points, linearizing the equation in an infinitesimal correction amount of physical property (potential, electron density, or the like) on respective discretization mesh points, setting a coefficient matrix to calculate the infinitesimal correction amount, calculating the infinitesimal correction amount by solving the matrix problem, and updating the physical property on respective discretization mesh points by use of calculated infinitesimal correction amount are repeated until the potential, etc. have converged.

First, a device structure whose electrical parameters are to be evaluated is input (step S301). In this step, profiles, impurity distribution, etc. calculated by the process simulator can be input. As another input method, the operator can input directly device profiles into the above computer system via the input device such as the mouse. In turn, an Si thickness (referred to as "$\Delta Z$" hereinafter) equivalent to difference in inversion layer capacitance between the classical theory and the quantum theory is calculated (step S302). In this step, calculation may be carried out actually, but a certain value may be prepared in advance. For example, such an approximation may be employed that $\Delta Z$ is independent on the device structure or biases applied to the device and is thus a constant value. For example, a value of 1.7 nm may be employed herein.

Next, the Delaunay discretization mesh in which the distance from the $Si/SiO_2$ interface to the mesh point in Si closest to the interface is equal to the previously calculated $\Delta Z$ is generated (step S303). The explanation similar to that made with reference to FIG. 6 may be applied as process in step S303, its explanation will be omitted.

Subsequently, biases such as a gate voltage, drain voltage, etc. are set (step S304). Initial values of potential, electron density, and hole density are set at respective discretization mesh points (step S305). However, in step S305, the initial value of the electron density at the discretization mesh points on the $Si/SiO_2$ interface is set to zero. In turn, the coefficient matrix is set with the use of set potential, etc. to calculate the infinitesimal correction amount (step S306). However, the coefficient matrix is set by imposing the condition such that the infinitesimal correction amount of the electron density at the mesh point on the $Si/SiO_2$ interface should converge at zero. Next, the set matrix problem is solved to calculate the infinitesimal correction amount (step S307). Then, physical properties such as the previously set potential, etc. are updated (step S308). Since the initial value of the electron density at the discretization mesh points on the $Si/SiO_2$ interface is zero and the infinitesimal correction amount is also zero, the electron density at the discretization mesh points on the Si/SiO$_2$ interface is not changed to thus still remain at zero as it is after the process in step S308 has been conducted. In the fifth embodiment, since the electrical parameter evaluation of the N-type MOSFET is performed, the electron density at the discretization mesh points on the Si/SiO$_2$ interface has been set to zero in steps S305 and S306. However, if the electrical parameter evaluation of the P-type MOSFET is to be performed, the hole density should be set to zero.

Then, it is determined whether or not previously updated potential, etc. have been converged (step S309). Unless they have been converged, the process returns to step S306 again, then the coefficient matrix is set, then the matrix is solved, and then the potential, etc. are updated (steps S306 to S308). In contrast, if it has been decided that they have been converged, it is determined whether or not the calculation with another biases are requested (step S310). If requested, the process returns to step S304 and the process of bias setting in step S304 et seq. are carried out. If all necessary biases have been calculated, calculation results are output (step S311) and then the processes are ended.

According to the fifth embodiment, calculations can be achieved with high precision equivalent to the case where the Schrodinger equation and the Poisson equation are solved in a self-consistent manner by the same calculation time as the case where calculations are carried out based on the classical theory.

(Sixth Embodiment)

Figure 15:
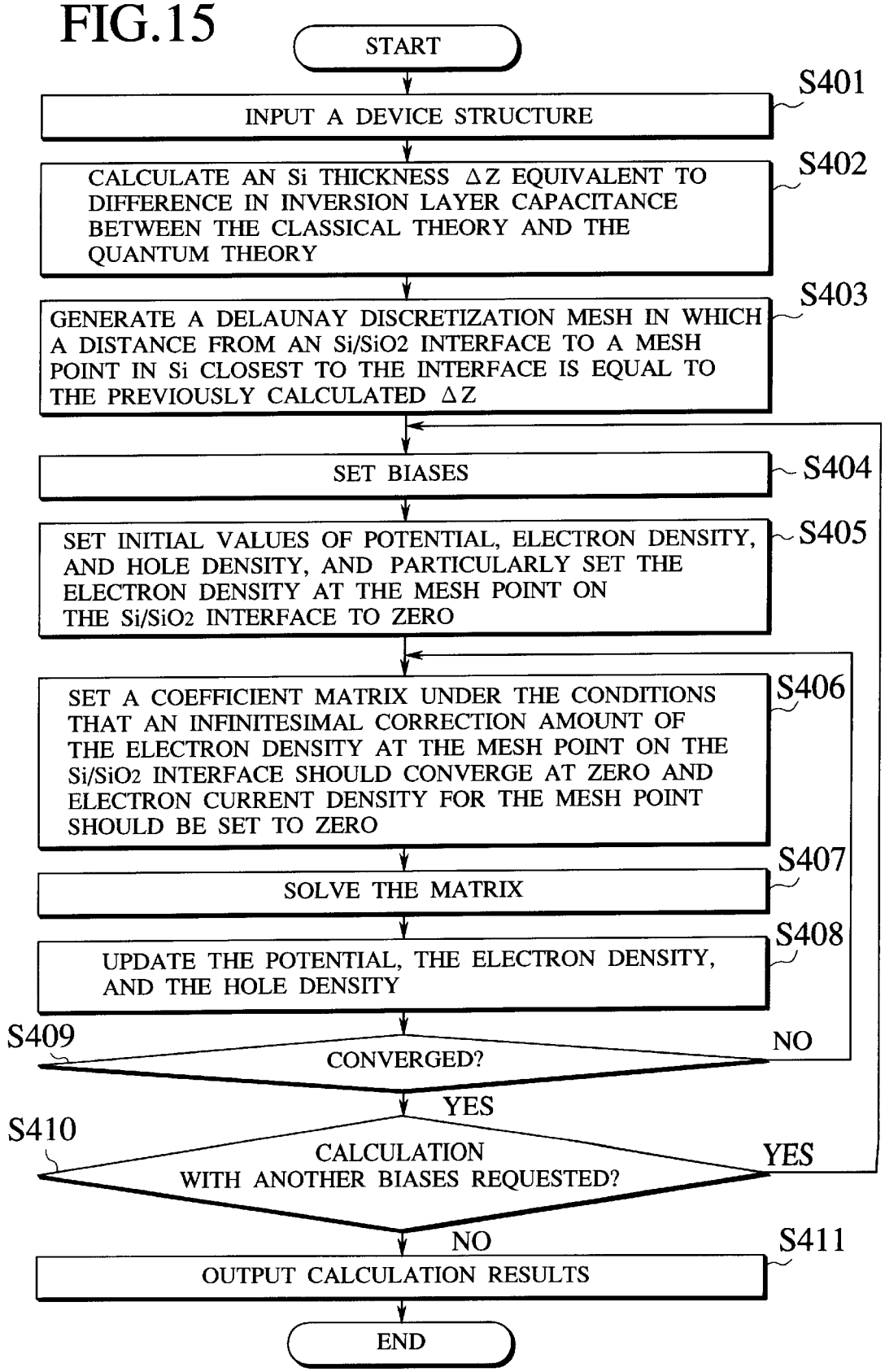
FIG. 15 is a flowchart showing an electrical parameter evaluation method according to a sixth embodiment of the present invention.

Next, an electrical parameter evaluation method according to a sixth embodiment of the present invention will be explained with reference to FIG. 15. One-dimensional MISFET device simulation can only solves the Poisson equation as shown in the fifth embodiment. However, in order to execute two-dimensional or three-dimensional simulation which takes a two-dimensional or three-dimensional structure of the device into consideration, not only the Poisson equation but also the current flow equation of only electrons or only holes or both electrons and holes must be solved. As the implement example, a flowchart for executing two-dimensional analysis of the N-type MOSFET is shown in FIG. 15. This flowchart is different from the flowchart shown in the fifth embodiment in the process in step S406. Accordingly, in the sixth embodiment, since the process explained with reference to FIG. 11 can be employed as the process in step S406 wherein the coefficient matrix is set under the conditions that the electron current density at the mesh point on the Si/SiO$_2$ interface is set to zero, its explanation will be omitted herein.

Features of the present invention are that such a condition is imposed that the infinitesimal correction amount of the electron density at the mesh point on the Si/SiO$_2$ interface should converge at zero and the coefficient matrix is set with the use of above Eq. (5) in place of Eq. (4) as the conventional electron conservation equation in order to set the electron current density for the mesh point to zero. According to the process, it is possible to obtain numerical solutions which can satisfy that the electron density at the mesh point on the Si/SiO$_2$ interface is zero and satisfy the electron conservative law.

(Seventh Embodiment)

Next, an electrical parameter evaluation method according to a seventh embodiment of the present invention will be explained with reference to FIG. 12. In the seventh embodiment, the case where electrical parameters of the device shown in FIG. 12 are calculated numerically will be discussed. There exist interfaces 101 to 105 between the insulating film and the semiconductor substrate in the device shown in FIG. 12. Out of these interfaces, the interface 103 corresponds to the interface between the gate oxide film and the semiconductor substrate. Hence, two-dimensional quantization of the carrier occurs at the interface 103 whereas no two-dimensional quantization occurs at remaining interfaces. Consequently, the two-dimensional quantization effect should be considered only at the interface 103 between the insulating film and the semiconductor substrate.

If the present invention is not applied to all interfaces between the insulating film and the semiconductor substrate but applied only to a part of the interfaces between the insulating film and the semiconductor substrate, the electrical parameter evaluation will be performed in the following, for example. As shown in FIG. 12, an x-axis is set on an abscissa and a y-axis is set on an ordinate and then such an instruction that the interface between the insulating film and the semiconductor substrate, at which two-dimensional quantization is to be considered, is present at the position of $y=y_0$ is input as input data in step S401 in FIG. 15 wherein the device structure is to be input. Thereby, the electrical parameter evaluation system according to the seventh embodiment can recognize that, in FIG. 12, the interface 103 between the insulating film and the semiconductor substrate corresponds to the interface between the gate insulating film and the semiconductor and the quantum-mechanical effect of charges must be considered at the same interface, and thus can perform the processes shown in the sixth embodiment at the same interface. Like this, by applying partially the present invention as in the seventh embodiment, the electrical parameter evaluation can be carried out with the same precision as those in the above embodiments in a shorter process time.

(Eighth Embodiment)

Next, an electrical parameter evaluation method according to an eighth embodiment of the present invention will be explained with reference to FIG. 13. In the eighth embodiment, the case where electrical parameters of the CMOS inverter circuit shown in FIG. 13 are calculated numerically will be considered.

As described above, since the interface 205 is the interface between the gate oxide film and the semiconductor substrate of the P-type FET using the holes as the carrier, two-dimensional quantization of the electrons occurs at the interface 201 whereas two-dimensional quantization of the holes occurs at the interface 205. Consequently, the two-dimensional quantization effect of the electron should be considered only at the interface 201 and the two-dimensional quantization effect of the holes should be considered only at the interface 205.

For instance, the electrical parameter evaluation to calculate the electrical parameters of such device numerically will be performed as follows. As shown in FIG. 13, an x-axis is set on an abscissa and a y-axis is set on an ordinate, and then such an instruction that the interface between the insulating film and the semiconductor substrate, at which two-dimensional quantization of the electrons is to be considered, is present at the position of $y=y_0$ and $x<x_0$ and the interface between the insulating film and the semiconductor substrate, at which two-dimensional quantization of the holes is to be considered, is present at the position of $y=y_0$ and $x>x_0$ is input as input data in step S401 wherein the device structure is to be input. Thereby, the electrical parameter evaluation system according to the eighth embodiment can recognize that, in FIG. 13, the interface 201 corresponds to the interface between the gate insulating film and the semiconductor, at which two-dimensional quantization of the electrons occurs, and the interface 205 corresponds to the interface between the gate insulating film and the semiconductor, at which two-dimensional quantization of the holes occurs, and thus can perform the processes for the electrons and the holes shown in the sixth embodiment at the interfaces 201 and 205 respectively. In this manner, by applying partially the present invention as in the eighth embodiment, the electrical parameter evaluation can be carried out with the same precision as those in the above embodiments in a shorter process time.

(Ninth Embodiment)

Then, an electrical parameter evaluation method according to a ninth embodiment of the present invention will be explained with reference to FIG. 16. Now we consider the case where the gate capacitance of the Si N-type MOSFET is one-dimensionally calculated with respect to the gate bias from an accumulation region to an inversion region. In the event that the gate bias is applied to form the channel region of the FET, when the quantum-mechanical effect is approximately taken into account according to the method explained in the fifth embodiment, high precision calculation can be achieved since the electrons are two-dimensionally quantized in the channel region. On the contrary, in the event that the gate bias is applied to accumulate the holes in the channel region of the FET, the electrons are not two-dimensionally quantized in the channel region. Therefore, when the quantum-mechanical effect is taken approximately into account according to the method explained in the fifth embodiment, conversely low precision calculation results in. This is because, though no two-dimensional quantization occurs, the method explained in the fifth embodiment has yielded the electrical parameter evaluation as if two-dimensional quantization occurs. A method to solve this will be explained with reference to FIG. 16 showing a flowchart as an electrical parameter evaluation method according to the ninth embodiment.

Figure 16:
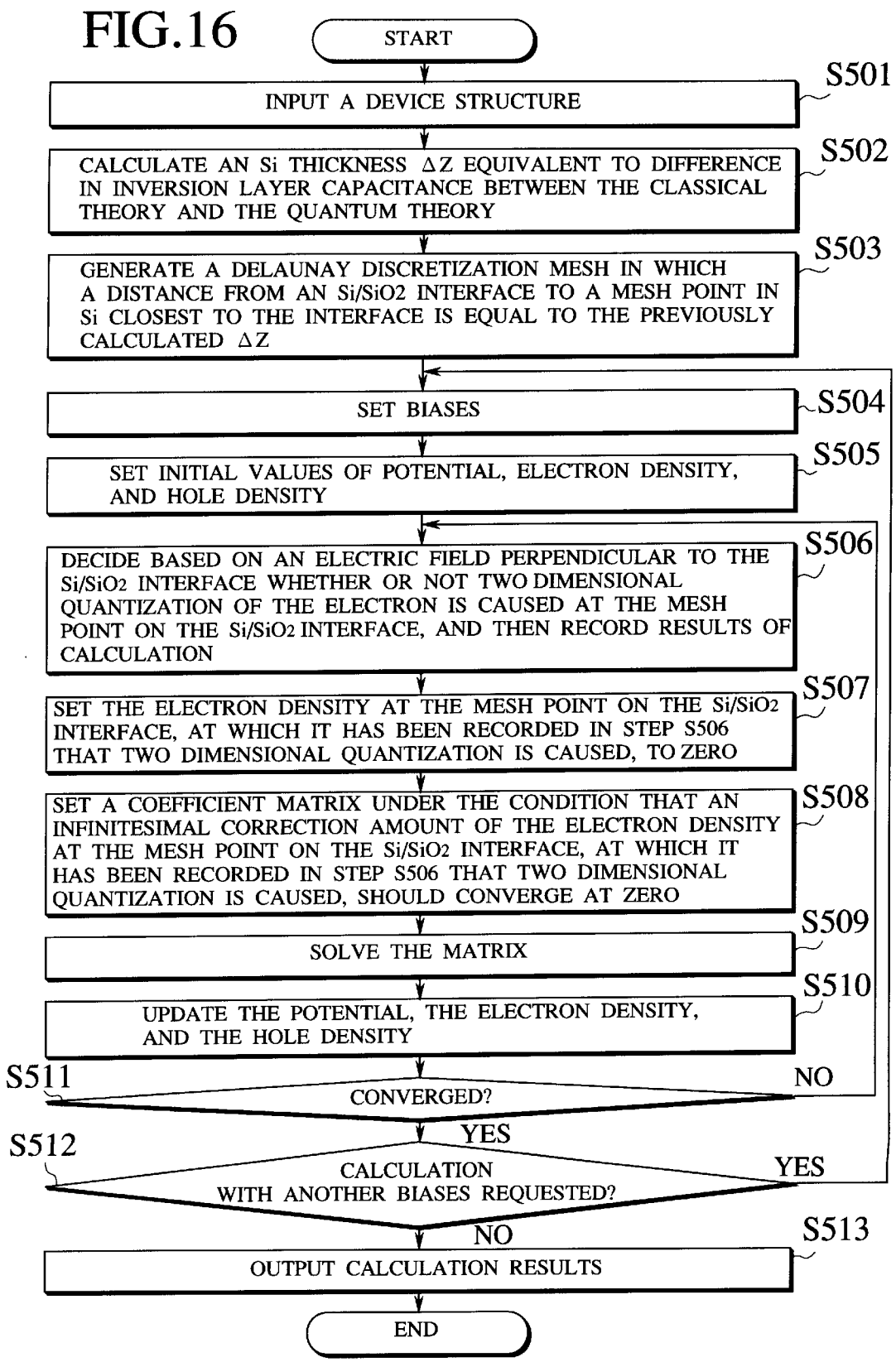
FIG. 16 is a flowchart showing an electrical parameter evaluation method according to a ninth embodiment of the present invention.

One of differences between FIG. 16 showing the flowchart in the ninth embodiment and FIG. 14 showing the flowchart in the fifth embodiment is process in step S505 in FIG. 16. In step S505, unlike step S405 in FIG. 14, the electron density at the mesh point on the Si/SiO$_2$ interface is not set to zero.

The differences between FIG. 16 showing the flowchart in the ninth embodiment and FIG. 14 showing the flowchart in the fifth embodiment is the presence of steps S506 and S507. In step S506, it is decided whether or not two dimensional quantization of the electron is caused at the mesh point on the Si/SiO$_2$ interface. This decision is made based on an electric field perpendicular to the Si/SiO$_2$ interface, and then the calculation results are recorded and used. This step S506 can be attained if whether or not two-dimensional quantization occurs is decided by, for example, deciding the inversion region or the accumulation region from positive/negative signs of the electric field at the mesh point on the Si/SiO$_2$ interface approximately and then setting the results into a result saving variable.

In step S507, the electron density at the mesh point on the Si/SiO$_2$ interface, at which it has been recorded in step S506 that two dimensional quantization is caused, is set to zero. Though the electron density at the discretization mesh points on all Si/SiO$_2$ interfaces has been set to zero in step S505 in the fifth embodiment, the electron density at the mesh point on the Si/SiO$_2$ interface, at which it has been recorded in step S506 that two dimensional quantization is caused, is set to zero in the ninth embodiment.

The other of differences between FIG. 16 showing the flowchart in the ninth embodiment and FIG. 14 showing the flowchart in the fifth embodiment is process in step S508 in FIG. 16. In FIG. 14 showing the flowchart in the fifth embodiment, the coefficient matrix has been set by imposing the condition such that the infinitesimal correction amount of the electron density at the discretization mesh points on the all Si/SiO$_2$ interfaces should converge at zero (step S306). In contrast, in the ninth embodiment, the condition that an infinitesimal correction amount of the electron density should converge at zero is imposed to only the discretization mesh points on the Si/SiO$_2$ interface, at which it has been recorded in step S506 that two dimensional quantization is caused (step S508). Next, the electron density at the mesh point on the Si/SiO$_2$ interface, at which it has been recorded in step S506 that two dimensional quantization is caused, is always set to zero (step S507, S508).

In this manner, according to the ninth embodiment, it is possible not to execute the process that the quantum-mechanical effect is regarded approximately unless the bias causes the two-dimensional quantization of the carrier, so that high precision evaluation can be achieved even when the bias condition causing the accumulate state is set.

(Tenth Embodiment)

Figure 17:
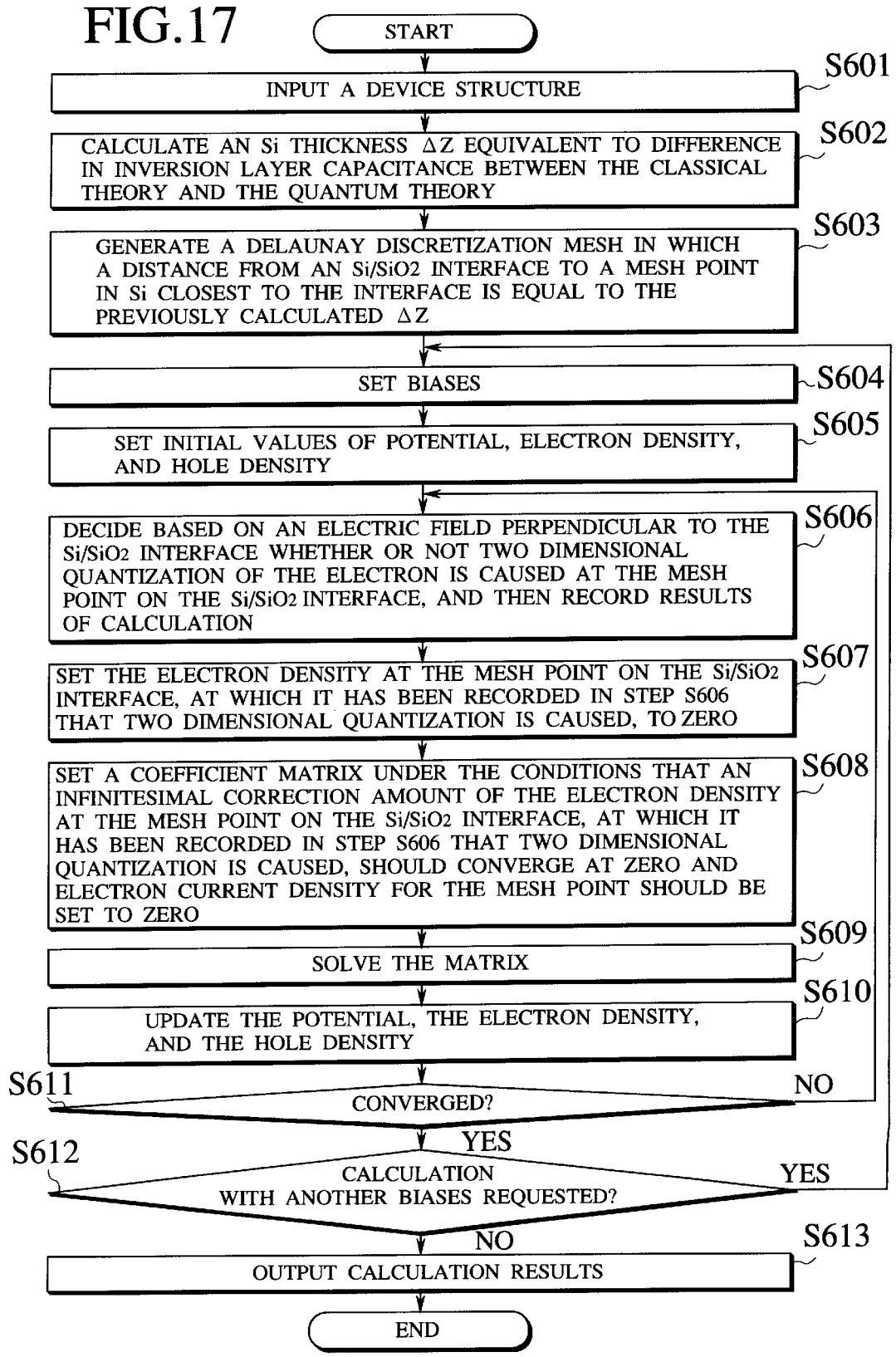
FIG. 17 is a flowchart showing an electrical parameter evaluation method according to a tenth embodiment of the present invention.

Then, an electrical parameter evaluation method according to a tenth embodiment of the present invention will be explained with reference to FIG. 17. The process in step S506 in FIG. 16 showing the flowchart according to the ninth embodiment, wherein it is decided based on the electric field whether or not two dimensional quantization is caused at the mesh point on the Si/SiO$_2$ interface, and then the results of calculation is recorded, can also be applied to two-dimensional or three-dimensional device structure. A flowchart according to the tenth embodiment is shown in FIG. 17.

Since the processes from step S601 to S605 have been explained in the previous embodiment, their explanation is omitted. Then, the process wherein it is decided based on an electric field perpendicular to the Si/SiO$_2$ interface whether or not two dimensional quantization of the electron is caused at the mesh point on the Si/SiO$_2$ interface, and then results of calculation is recorded (step S606).

Next, the process explained in the sixth embodiment is applied to the discretization mesh point on the Si/SiO$_2$ interface, at which it has been recorded in step S606 that two dimensional quantization is caused, and solution that both the electron current density and the electron density converge at zero is calculated (step S607 to step S610).

Like the above, according to the tenth embodiment, it is possible not to execute the process that the quantum-mechanical effect is taken approximately into consideration at the Si/SiO$_2$ interfaces wherein the two-dimensional quantization of the carrier does not occur, so that high precision evaluation can be achieved.

(Eleventh Embodiment)

Figure 1:
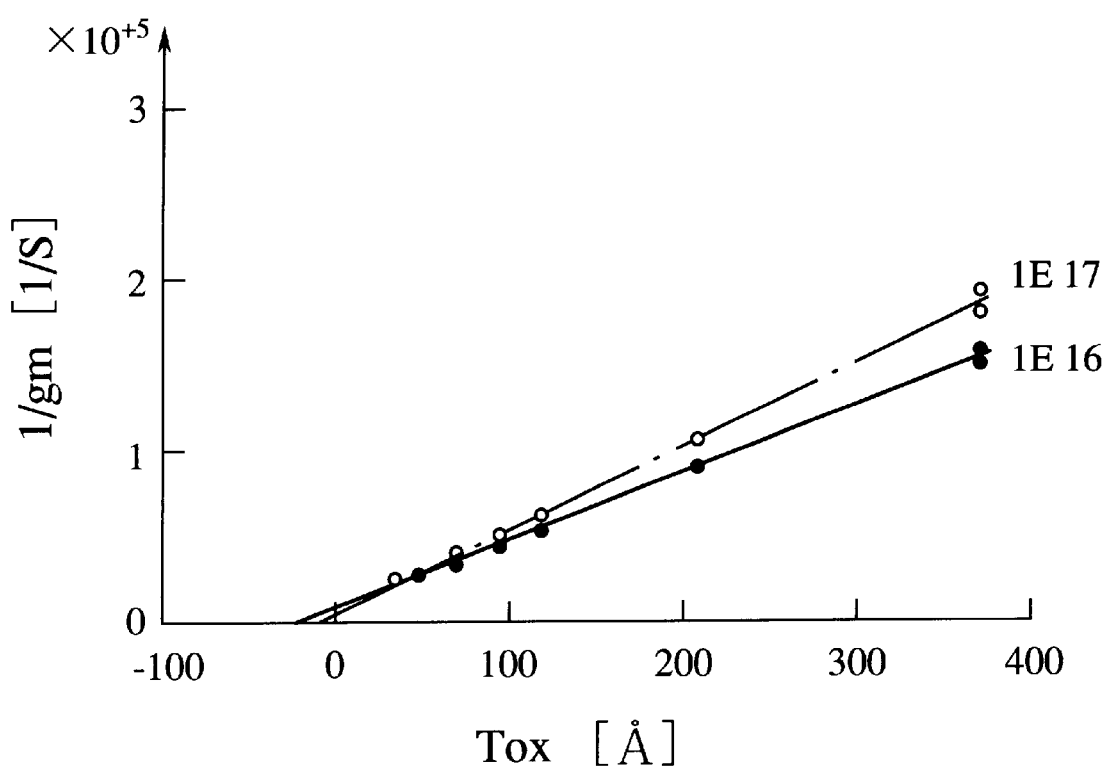
FIG. 1 is a graph showing a relationship between a reciprocal of a maximum value of a current amplification factor and a thickness of a gate oxide film.
Figure 2:
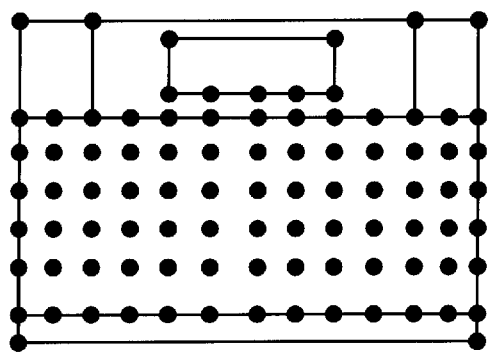
FIG. 2 is a schematic view showing a Delaunay discretization mesh which has been known in the prior art.
Figure 3:
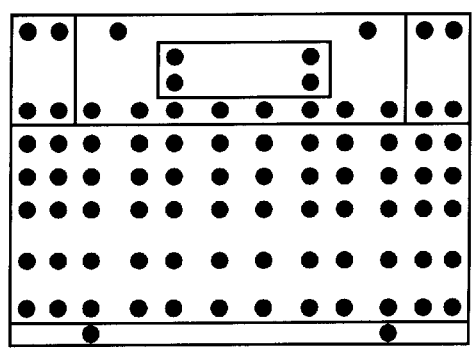
FIG. 3 is a schematic view showing a Voronoi discretization mesh which has been known in the prior art.
Figure 4:
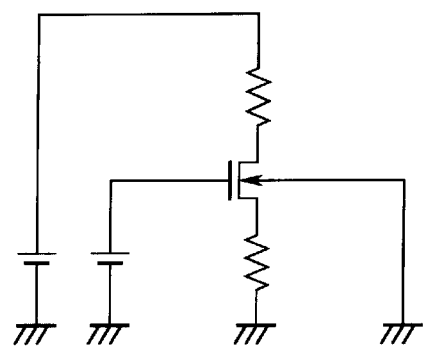
FIG. 4 is a circuit diagram showing an example of a device having an external circuit which can be calculated by a device simulator with the use of the Delaunay discretization mesh.
Figure 18:
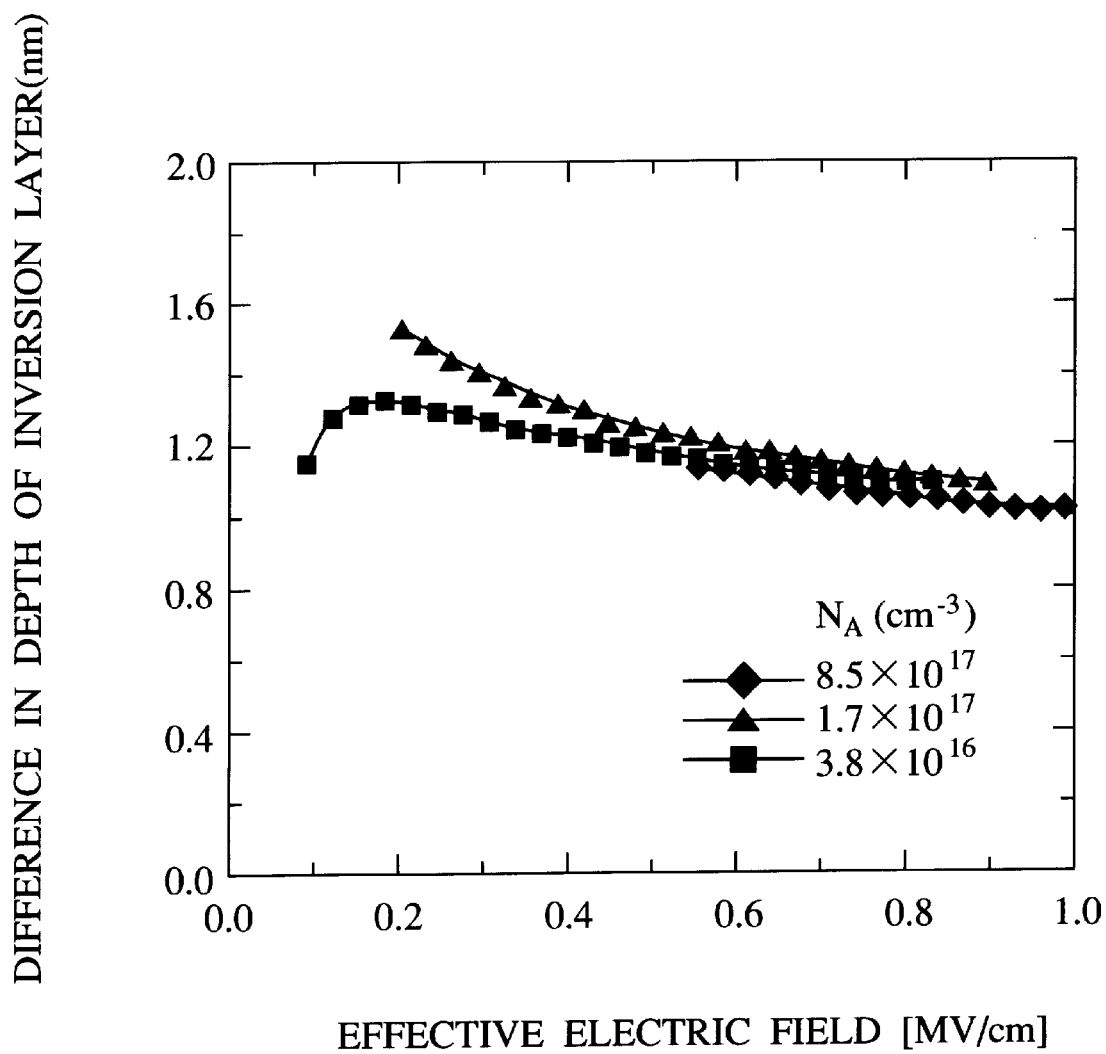
FIG. 18 is a graph showing calculation results of difference in average depth of an electron inversion layer against an effective electric field between the classical theory and the quantum theory.
Figure 19:
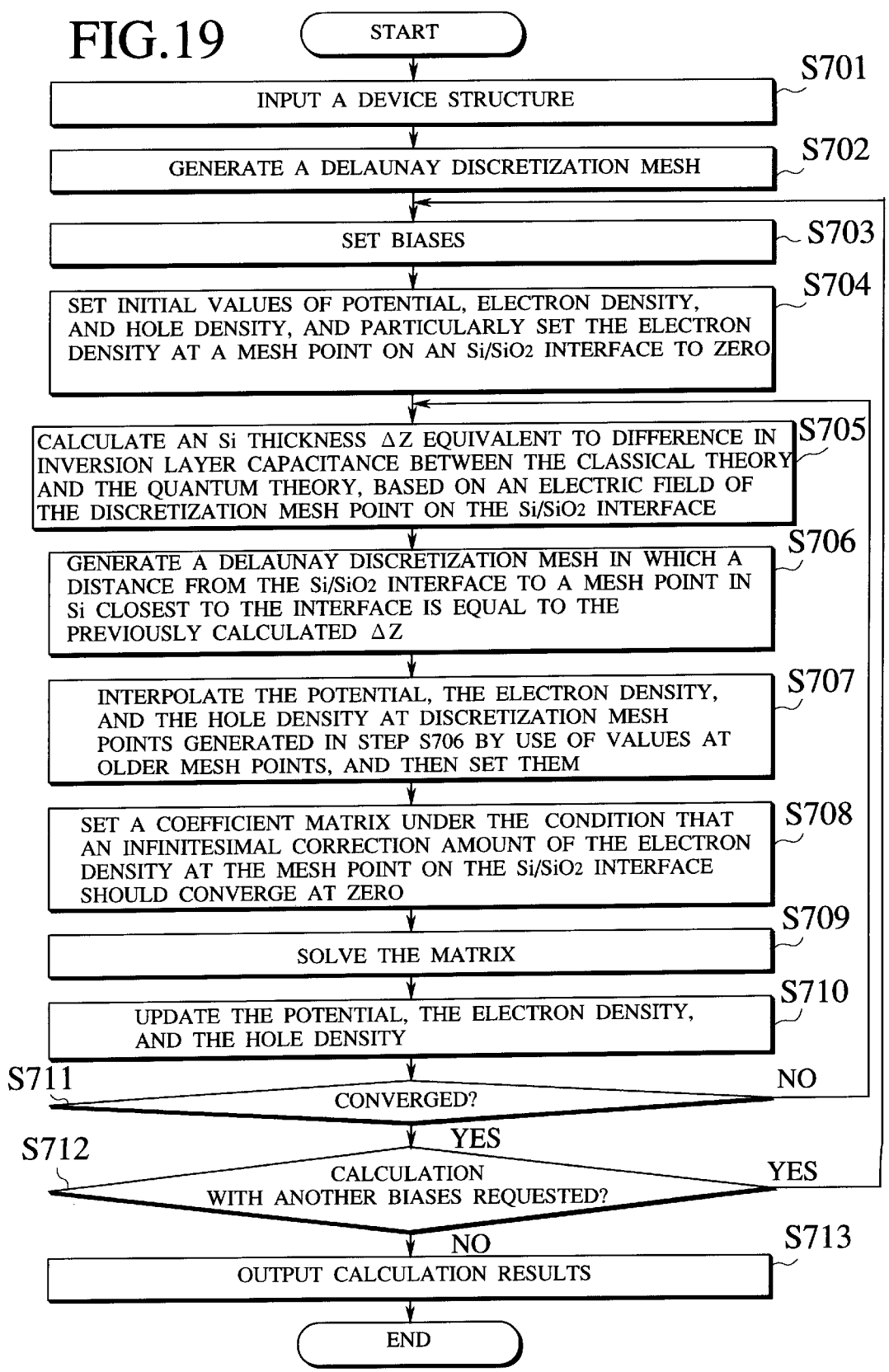
FIG. 19 is a flowchart showing an electrical parameter evaluation method according to an eleventh embodiment of the present invention.

In turn, an electrical parameter evaluation method according to an eleventh embodiment of the present invention will be explained with reference to FIG. 19. Although a fixed value has been employed without calculation of $\Delta Z$ in the above embodiments, $\Delta Z$ calculation process will be explained particularly in the eleventh embodiment. FIG. 18 shows difference in an average depth of the electron inversion layer against an effective electric field between the classical theory and the quantum theory (Y. Ohkura, "Quantum Effects in Si n-MOS Inversion Layer at High Substrate Concentration", Solid-State Elec., 33, 1581 (1990), FIG. 4(b)). From this result, it can be seen that difference in the average depth of the electron inversion layer between the classical theory and the quantum theory has a dependency, though small, on the substrate concentration and the bias. This means that difference in the inversion layer capacitance between the classical theory and the quantum theory has a dependency on the substrate concentration and the bias although it is small. The evaluation with higher precision can be accomplished if such dependency is taken into account.

A flowchart showing softwares according to the eleventh embodiment of the present invention, which is able to take such dependency into account will be explained with reference to FIG. 19.

The Delaunay discretization mesh is generated as above (step S702). Then, initial values of physical properties such as potential, etc. are set (step S704). Then, an Si thickness $\Delta Z$ which is equivalent to difference in inversion layer capacitance between the classical theory and the quantum theory is calculated based on the electric field of the discretization mesh points on the Si/SiO$_2$ interface (step S705). Step S705 can implemented by expressing the results in FIG. 11 numerically in advance and recording them, and then interpolating data of the results with reference to the recorded results in step S705, if necessary.

The Delaunay discretization mesh in which the distance from the Si/SiO$_2$ interface to the mesh point in Si closest to the interface is equal to the $\Delta Z$ previously calculated in step S705 is generated (step S706). The initial values are set since the initial values at the discretization mesh points must be set(step S707). The initial values can be set by interpolating physical properties at the older discretization mesh points before the process in step S706 is executed. Then, physical equations such as the Poisson equation are solved by use of the discretization mesh generated in step S706 and the initial values set in step S707 (step S708 to S709). Unless it is decided that the potential, etc. have converged (step S711), the process of $\Delta Z$ calculation and forth are executed (step S705).

In this fashion, according to the eleventh embodiment, the event that difference in the inversion layer capacitance between the classical theory and the quantum theory depends on the substrate concentration, the bias, etc. can be considered, and therefore the evaluation with higher precision can be accomplished.

(Twelfth Embodiment)

Figure 20:
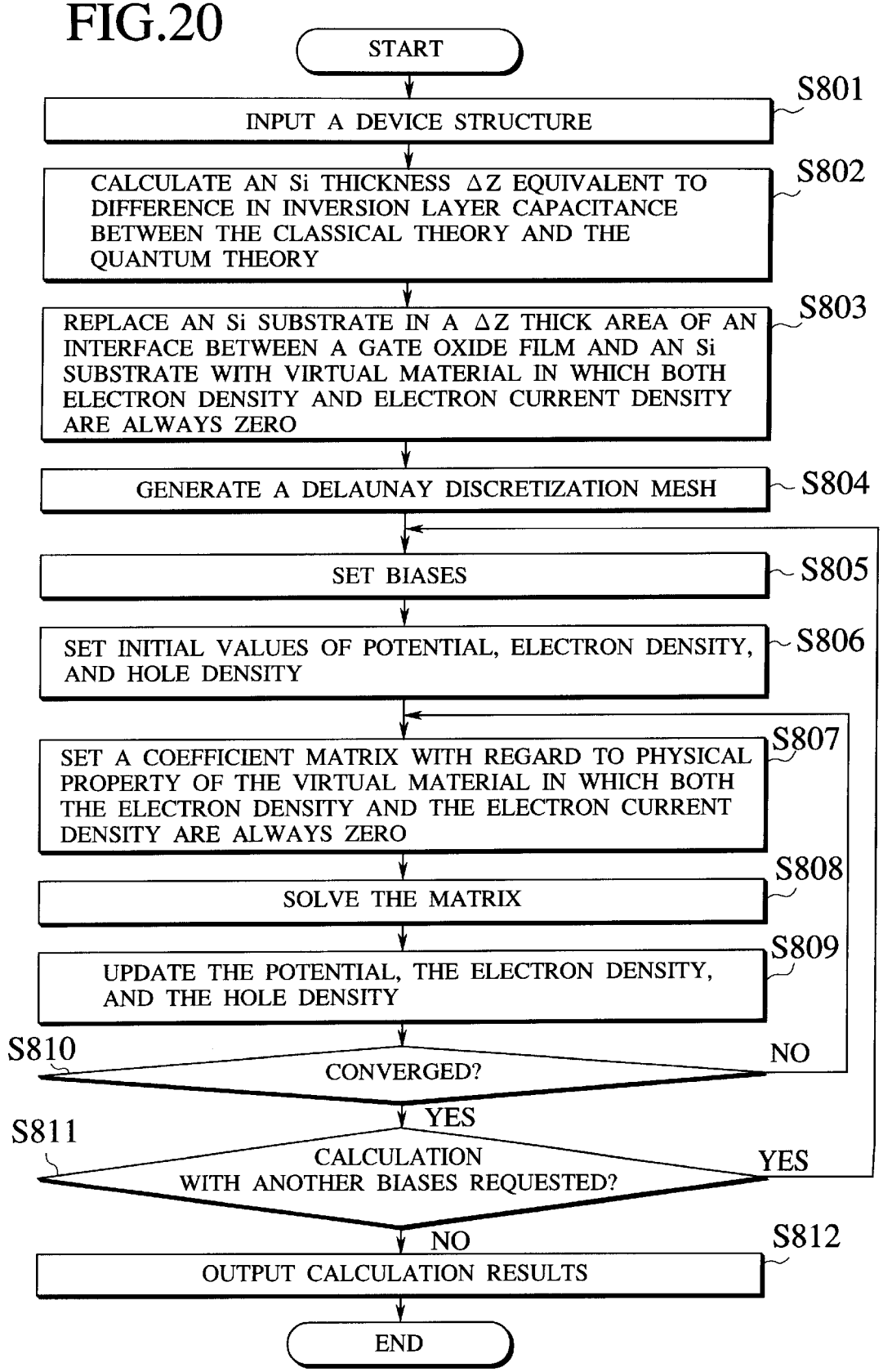
FIG. 20 is a flowchart showing an electrical parameter evaluation method according to a twelfth embodiment of the present invention.

Then, an electrical parameter evaluation method according to a twelfth embodiment of the present invention will be explained with reference to FIG. 20.

In the fifth to eleventh embodiments, the coefficient matrix has been set under the assumption that the carrier density at which two-dimensional quantization occurs is set to zero and the current density of the carrier is zero. In the twelfth embodiment of the present invention, though being in principle equal to the above method, the method for which the software can be prepared more easily will be explained with reference to FIG. 20 while taking the N-type MOSFET on the Si substrate as an example.

Since the processes up to step S802 may be similar to those in the sixth embodiment, their explanation will be omitted.

Figure 21:
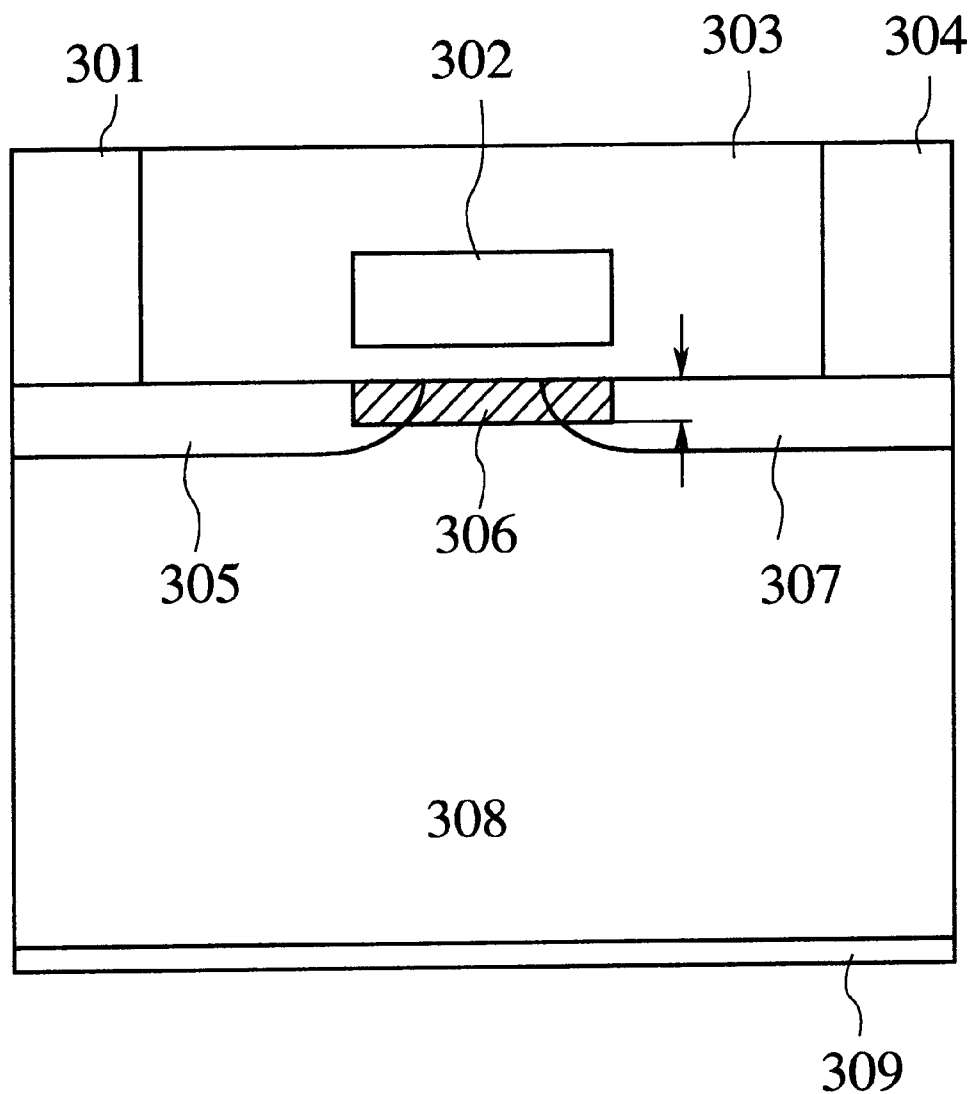
FIG. 21 is a view showing a virtual material which has been obtained by step S803, which has the completely same physical properties as Si except that an electron density and an electron current density are zero.

Then, virtual material having the completely same physical properties as Si other than that both the electron density and the electron current density are always zero is supposed, and the Si substrate in the $\Delta Z$ thick area of the interface between the gate insulating film and the Si substrate is replaced with the virtual material (step S803). FIG. 21 is a view showing MOSFET to explain the twelfth embodiment. The virtual material 306 is considered in FIG. 21. This virtual material can be set so as to have the same physical properties as Si other than that the electron density and the electron current density are always zero.

Since the steps S804 and S805 have been explained in the previous embodiment, their explanation will be omitted.

Next, the initial values of physical properties are set (step S806). At this time, since the interface between the gate oxide film and the Si substrate is not formed by Si and replaced with the virtual material, the electron density at the interface is set to zero. This process can be accomplished readily if setting of the initial values of the potential and the hole density can be carried out similarly to usual Si and setting of the initial value of the electron density can be carried out similarly to usual insulator.

Then, the coefficient matrix is set to calculate the infinitesimal correction amount with regard to physical property of the virtual material in which both the electron density and the electron current density are always zero (step S807). This process can also be accomplished readily if setting of the coefficient matrix in connection with the hole density and the hole current density can be carried out similarly to usual Si and setting of the coefficient matrix in connection with the electron density and the electron current density can be carried out similarly to setting of the coefficient matrix in connection with the usual insulating film region under the assumption that the electron density and the electron current density are zero. Since the processes here and forth have been explained in the previous embodiment, their explanation will be omitted.

Like this embodiment in this manner, suppose that the virtual material having the completely same physical properties as Si except that the electron density and the electron current density are always zero, then the electrical parameter evaluation system which is able to evaluate the quantum-mechanical effect of the carrier approximately by improving a very small part of the conventional electrical parameter evaluation system can be implemented if the processes are executed with the use of such material.

Since explanation has been made while taking the N-type FET as an example in the twelfth embodiment, the virtual material which has the completely same physical properties as Si except that the electron density and the electron current density are zero has been considered. But, in the case of the P-type FET, the virtual material which has the completely same physical properties as Si except that the hole density and the hole current density are zero may be considered.

A program for carrying out the above electrical parameter evaluation method can be saved into a recording medium. The electrical parameter evaluation method can be carried out while controlling the computer, by causing the computer system to read the recording medium and to thus execute the program. In the recording medium, any devices such as a memory device, a magnetic disk drive, an optical disk drive, etc. which can record the program are included.

Various modifications will become possible for those skilled in the art after receiving the teaching of the present disclosure without departing from the scope thereof.

As explained above, according to the electrical parameter evaluation system, an electrical parameter evaluation method, and the computer-readable recording medium for recording the electrical parameter evaluation program according to the present invention, the electrical parameter evaluation of MISFET with the use of the Delaunay discretization scheme can be performed, which can take the quantum-mechanical effect in account approximately by the calculation time equivalent to that required for the simulator with the use of the classical theory and can be applied to the case the impurity distribution in the semiconductor substrate is not uniform.

What is claimed is:

1. A system for evaluating electrical parameters of a semiconductor device, comprising:

a $\Delta Z$ calculator for calculating difference between an inversion layer capacitance by a classical theory and an inversion layer capacitance by a quantum theory, calculating $\Delta Z$ which is a thickness of a semiconductor substrate equivalent to the difference in inversion layer capacitance, and storing the $\Delta Z$;

a discretization mesh generator for generating a Delaunay discretization mesh for a structure of the semiconductor device to be evaluated, and storing the discretization mesh; and an electrical parameter calculator for calculating electrical parameters of the semiconductor device under constraint that a charge density of channel conductivity type of the semiconductor device is set to zero at discretization mesh points of the discretization mesh on an interface between an insulating film and the semiconductor substrate and at discretization mesh points of the discretization mesh in the semiconductor substrate which are located within a distance less than or equal to the stored $\Delta Z$ from the interface between the insulating film and the semiconductor substrate.

2. A method of evaluating electrical parameters of a semiconductor device, comprising:

a discretization mesh generating step of generating a Delaunay discretization mesh for a structure of the semiconductor device to be evaluated; and an electrical parameter calculating step of calculating electrical parameters of the semiconductor device under constraint that a charge density of channel conductivity type of the semiconductor device is set to zero at discretization mesh points of the discretization mesh on an interface between an insulating film and the semiconductor substrate and at discretization mesh points of the discretization mesh in the semiconductor substrate which are located within a distance less than or equal to $\Delta Z$ from the interface between the insulating film and the semiconductor substrate, the $\Delta Z$ being a thickness of a semiconductor substrate equivalent to a difference between an inversion layer capacitance by a classical theory and an inversion layer capacitance by a quantum theory.

3. A method of evaluating electrical parameters of a semiconductor device, comprising:

an inputting step of inputting device structure information of the semiconductor device and channel conductivity type information on an interface between a gate insulating film and a semiconductor substrate as input data;

an input data storing step of storing the input data;

a $\Delta Z$ calculating step of calculating difference between an inversion layer capacitance by a classical theory and an inversion layer capacitance by a quantum theory based on the stored input data, and calculating $\Delta Z$ which is a thickness of the semiconductor substrate equivalent to the difference in inversion layer capacitance;

a $\Delta Z$ storing step of storing the calculated $\Delta Z$;

a discretization mesh generating step of generating a Delaunay discretization mesh which has discretization mesh points in the semiconductor substrate remote at least from the interface between the gate insulating film and the semiconductor substrate by a distance equal to the $\Delta Z$, using the device structure information;

an electrical parameter calculating step of calculating electrical parameters of the semiconductor device under constraint that a charge density of channel conductivity type which is input as the input data is set to zero at discretization mesh points of the discretization mesh on the interface between the insulating film and the semiconductor substrate and at discretization mesh points of the discretization mesh in the semiconductor substrate which are located within a distance less than or equal to the $\Delta Z$ from the interface between the insulating film and the semiconductor substrate; and an outputting step of outputting calculated electrical parameters.

4. The method as claimed in claim 2, wherein the discretization mesh generating step can set the discretization mesh such that a distance of the discretization mesh points in the semiconductor substrate, which are closest to the interface between the insulating film and the semiconductor substrate except the discretization mesh points on the interface between the insulating film and the semiconductor substrate, from the interface between the insulating film and the semiconductor substrate becomes equal to the $\Delta Z$.

5. The method as claimed in claim 3, wherein, if a part of the interface between the insulating film and the semiconductor substrate of the semiconductor device is formed of an interface between a gate insulating film and the semiconductor substrate, the inputting step can input device structure information of the semiconductor device and an area of the interface between the gate insulating film and the semiconductor substrate of the interface between the insulating film and the semiconductor substrate as input data.

6. The method as claimed in claim 3, wherein, if the semiconductor device has at least two gate insulating films, the inputting step can input device structure information of the semiconductor device and respective channel conductivity type information on interfaces between at least two gate insulating films and the semiconductor substrate as input data.

7. The method as claimed in claim 2, wherein the electrical parameter calculating step comprises, a decision step of deciding whether or not two-dimensional quantization of the channel conductivity type charge will occur at the discretization mesh points on the interface, based on an electric field perpendicular to the interface between the insulating film and the semiconductor substrate, and a calculating step of calculating electrical parameters of the semiconductor device under constraint that a charge density of channel conductivity type is set to zero at the discretization mesh points at which it has been decided that the two-dimensional quantization on the interface between the insulating film and the semiconductor substrate will occur and at all discretization mesh points in the semiconductor substrate which are located within a distance less than or equal to the $\Delta Z$ from the discretization mesh points at which it has been decided that the two-dimensional quantization will occur.

8. The method as claimed in claim 7, wherein the decision step decides whether or not two-dimensional quantization of the channel conductivity type charge will occur at the discretization mesh points on the interface, based on the electric field perpendicular to the interface between the insulating film and the semiconductor substrate on a basis of impurity concentration in the semiconductor substrate at the mesh points.

9. The method as claimed in claim 2, wherein, if at least one of discretization mesh points corresponds to the discretization mesh points at which the density of the channel conductivity type charge is set to zero, the electrical parameter calculating step can solve a current flow equation under constraint that a current density of the channel conductivity type charge between two discretization mesh points out of the current density between two discretization mesh points necessary for solving a current flow equation numerically is set to zero.

10. The method as claimed in claim 3, wherein the ΔZ calculating step can calculate the ΔZ based on the electric field perpendicular to the interface between the insulating film and the semiconductor substrate.

11. The method as claimed in claim 3, wherein the ΔZ calculating step can calculate the ΔZ at respective discretization mesh points with regard to an event that the electric field strength perpendicular to the interface between the insulating film and the semiconductor substrate varies based on a location of the interface.

12. The method as claimed in claim 3, wherein the ΔZ calculating step comprises, a step of calculating ΔZ in connection with electrons at respective mesh points, with regard to an event that the electric field strength perpendicular to the interface between the insulating film and the semiconductor substrate varies based on a location of the interface, and a step of calculating ΔZ in connection with holes at respective mesh points, with regard to the event that the electric field strength perpendicular to the interface between the insulating film and the semiconductor substrate varies based on the location of the interface.

13. The method as claimed in claim 2, wherein the electrical parameter calculating step can calculate the electrical parameters by solving a current flow equation under constraint that a charge generation or recombination rate in the semiconductor substrate, in which the distance from the interface between the insulating film and the semiconductor substrate is less than or equal to the ΔZ, is set to zero.

14. The method as claimed in claim 2, wherein the electrical parameter calculating step can solve a Poisson equation under an assumption that the interface having interface traps is located at a position which is remote from the interface between the insulating film and the semiconductor substrate by the distance being equal to the ΔZ.

15. The method as claimed in claim 2, wherein the electrical parameter calculating step can solve a Poisson equation and a current flow equation under an assumption that the interface having interface traps is located at a position which is remote from the interface between the insulating film and the semiconductor substrate by the distance being equal to the ΔZ.

16. The method as claimed in claim 2, wherein the electrical parameter calculating step comprises:

a step of replacing a semiconductor substrate area on the interface between the insulating film and the semiconductor substrate having a thickness of the semiconductor substrate equivalent to a difference in inversion layer capacitance in the device structure to be evaluated with a virtual material under an assumption that the virtual material has the same physical properties as the semiconductor substrate except that the charge density of the channel conductivity type is always zero, and a step of performing the electrical parameter evaluation of the device structure based on the classical theory.

17. The method as claimed in claim 2, wherein the electrical parameter calculating step comprises:

a step of replacing a virtual material has the same physical properties as the semiconductor substrate except that channel conductivity type charge density is always zero and channel conduction type charge current density is zero, and replacing a semiconductor substrate region on the interface between the semiconductor substrate and the insulating film having a thickness equal to a thickness of the semiconductor substrate equivalent to a difference in the inversion layer in the device structure to be evaluated with the virtual material, and a step of executing electrical parameter evaluation of the device structure based on the classical theory.

18. The method as claimed in claim 2, wherein the insulating film is a gate insulating film.

19. A computer-readable recording medium for recording an electrical parameter evaluation program, the program comprising:

a discretization mesh generating step of generating a Delaunay discretization mesh for a structure of the semiconductor device to be evaluated; and an electrical parameter calculating step of calculating electrical parameters of the semiconductor device under constraint that a charge density of channel conductivity type of the semiconductor device is set to zero at discretization mesh points of the discretization mesh on an interface between an insulating film and a semiconductor substrate and at discretization mesh points of the discretization mesh in the semiconductor substrate which are located within a distance less than or equal to ΔZ from the interface between the insulating film and the semiconductor substrate, the ΔZ being a thickness of a semiconductor substrate equivalent to the difference between an inversion layer capacitance by a classical theory and an inversion layer capacitance by a quantum theory.

* * * * *